United States Patent [19]

Gopalakrishnan et al.

[11] Patent Number: 5,422,966
[45] Date of Patent: Jun. 6, 1995

[54] MICROWAVE ELECTRO-OPTIC MIXER

[76] Inventors: Ganesh K. Gopalakrishnan, 8507 Koluder Ct., Lorton, Va. 22079; William K. Burns, 1212 Priscilla La., Alexandria, Va. 22308

[21] Appl. No.: 258,028

[22] Filed: Jun. 10, 1994

[51] Int. Cl.[6] .............................................. G02B 6/12
[52] U.S. Cl. ............................................ 385/2; 385/3
[58] Field of Search ............... 359/238, 254, 278, 325; 385/2, 3, 8, 9, 10

[56] References Cited

U.S. PATENT DOCUMENTS

| | | | |
|---|---|---|---|
| 4,824,201 | 4/1989 | Kazovsky | 380/96.16 |
| 5,060,307 | 10/1991 | El-Sherif | 385/2 |
| 5,168,534 | 12/1992 | McBrien et al. | 385/3 |
| 5,199,086 | 3/1993 | Johnson et al. | 385/2 |
| 5,231,405 | 7/1993 | Riza | 342/375 |
| 5,249,243 | 9/1993 | Skeie et al. | 385/3 |
| 5,323,406 | 6/1994 | Yee et al. | 382/2 |

OTHER PUBLICATIONS

Gopalakrishnan et al., "*Electronic Loss Mechanisms in Travelling* Wave LiNbO3 *Optical Modulators*".
Johnson, "*Relative Performance of Impedance-Matched Lumped-Element and Traveling-Wave Integrated-Optical Phase Modulators*", IEEE Photonics Technology Letters, vol. 1, No. 5, May 1989, pp. 102–104.
Gopalakrishnan, "*40GHz, Low Half-Wave Voltage TI: LiNbO3 Intensity Modulator*", Electronics Letters 23rd Apr. 1992, vol. 28, No. 9 pp. 826–827.
Dolfi et al., "*50GHz Velocity-Matched Broad Wavelength LiNbO3 Modulator with Multimode Active Section*", Electronics Letters, 18 Jun. 1992, vol. 28, No. 13, pp. 1197–1198.
Dolfi et al., "*40GHz Electro-Optic Modulator with 7.5V Drive Voltage*". Electronics Letters, 28 Apr. 1988, vol. 24, No. 9, pp. 528–529.
Noguchi et al., "*Highly Efficient 40-GHz Bandwidth Ti:LiNbO3 Optical Modulator Employing Ridge Structure*", IEEE Photonics Technology, Letters, vol. 5, No. 1, Jan. 1993, pp. 52–54.
Kolner, "*Electro-Optic Mixers*", LEOS 1991, Summer Topical Meetings, Sheraton, Newport Beach, Calif., pp. 18–19, IEEE#91TH0345-9.

*Primary Examiner*—Rodney B. Bovernick
*Assistant Examiner*—John Ngo
*Attorney, Agent, or Firm*—Thomas E. McDonnell; Daniel Kalish

[57] ABSTRACT

An electro-optic mixer includes means for providing first and second microwave signals having first and second frequencies, respectively, a device for providing a source light, a first modulator responsive to the source light and to the first microwave signal for producing a first modulated optical signal, a second modulator cascade coupled to the first modulator and being responsive to the first modulated signal and to the second microwave signal for producing a second modulated optical signal having a frequency component at the sum or difference or both of the first and second frequencies, and means coupled between the first and second modulators for transmitting the first modulated signal to the second modulator. Each of the first and second modulators is a broadband, low drive voltage, traveling wave intensity modulator including a substrate having a first optical waveguide adapted to receive and transmit light therethrough with a first phase velocity; a buffer layer disposed on the substrate; and a coplanar waveguide electrode structure on the buffer layer for receiving an electrical signal propagating therethrough with a second phase velocity to phase modulate the light in the optical waveguide. The substrate has a sufficiently small thickness so that coplanar mode-substrate mode coupling substantially does not occur, and the coplanar waveguide electrode structure has a sufficiently large thickness so that the first and second phase velocities are equal.

28 Claims, 17 Drawing Sheets

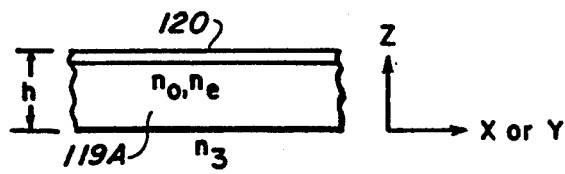
FIG. 3A
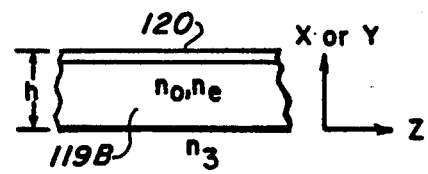
FIG. 3B
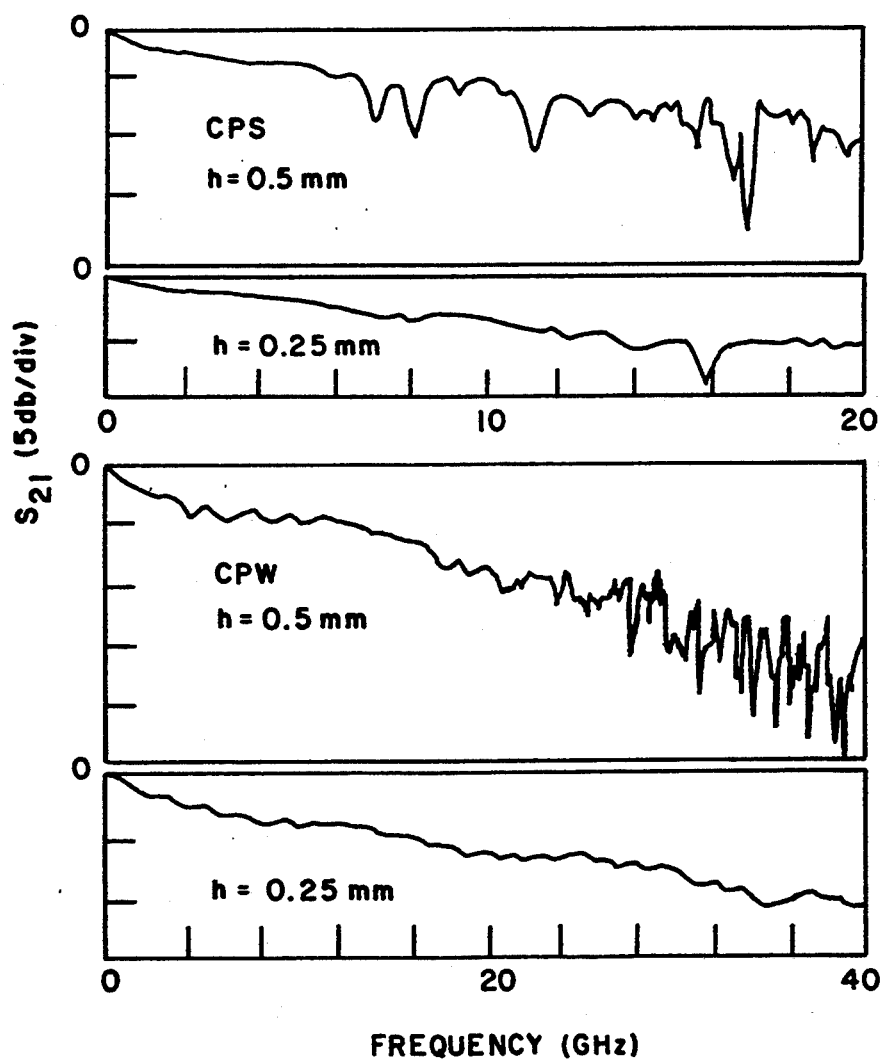
FIG. 4A
FIG. 4B
FIG. 4C
FIG. 4D

MICROWAVE ELECTRO-OPTIC MIXER

CROSS REFERENCE TO RELATED PATENTS AND APPLICATION

This application is related to commonly assigned and U.S. application Ser. No. 08/046,293, filed Apr. 14, 1993 by the inventors William K. Burns, Catherine H. Bulmer and Ganesh K. Gopalakrishnan and having docket no. NC 74,200. U.S. application Ser. No. 08/046,293 is incorporated herein by reference.

BACKGROUND OF THE INVENTION

The present invention relates to microwave mixers, and more particularly, to microwave electro-optic mixers using a cascade-connected pair of traveling wave modulators.

DESCRIPTION OF THE RELATED ART

A mixer is a nonlinear device which combines signals of different frequencies to produce a common output signal having the sum or difference or both of the input frequencies. Typically, a local oscillator (LO) reference signal is applied to one of the mixer ports, and a weaker signal (RF) to be converted is applied to a second mixer port. Sum and difference (IF) frequencies of the input signals and other higher order harmonics appear at the output port of the mixer. For transmitter application, a modulated low frequency RF signal is up-converted through a mixer to a higher microwave frequency and is usually amplified before being transmitted. This up-conversion usually involves the sum frequency. For receiver application, a received microwave signal is down-converted through a mixer to a lower frequency, which is then demodulated. This down-conversion usually involves the difference frequency, i.e. the IF frequency.

In conventional optoelectronic receivers, RF signals transmitted over an optical fiber are detected with a photodetector, following which down-conversion to an IF signal is accomplished through a conventional microwave mixer. However, there are several difficulties associated with this approach. If the transmitted optical signal is modulated at millimeter wave frequencies, then a high-speed photodetector is necessary to detect the transmitted signal. High-speed detectors, because of their fine geometries, typically saturate at fairly low optical power levels. These low power levels may be insufficient to overcome the inherent noise level of the optoelectronic system. Conventional microwave mixers have a limited bandwidth and are limited in port-to-port isolation. Such mixers also have high intermodulation (IM) distortion. Some of these problems can be circumvented by optical down-conversion, thereby eliminating the need for high-speed detection and the microwave mixer.

U.S. Pat. No. 5,199,086 to Johnson proposes an electro-optic mixer system using two electro-optic interferometric waveguide modulators coupled in series. However, the electro-optic modulators in the Johnson system may have high drive voltage. As a result, the mixer system proposed in Johnson would have high insertion, i.e. conversion loss and thus low efficiency. Such a system is not practical because, as with the conventional optoelectronic receivers, the modulation effect in the modulated optical signal would be masked by noise.

SUMMARY OF THE INVENTION

It is an object of this invention to provide a high speed electro-optic mixer having high port-to-port isolation.

It is a further object of the invention to provide an electro-optic mixer having low IM distortion.

Another object of the invention is to provide an electro-optic mixer having low conversion loss.

These and other objectives are achieved by an electro-optic mixer which includes means for providing first and second microwave signals having first and second frequencies, respectively, a device for providing a source light, a first modulator responsive to the source light and to the first microwave signal for producing a first modulated optical signal, a second modulator cascade coupled to the first modulator and being responsive to the first modulated signal and to the second microwave signal for producing a second modulated optical signal having a frequency component at the sum or difference or both of the first and second frequencies, and means coupled between the first and second modulators for transmitting the first modulated signal to the second modulator. Each of the first and second modulators is a broadband, low drive voltage, traveling wave intensity modulator including a substrate having a first optical waveguide adapted to receive and transmit light therethrough with a first phase velocity; a buffer layer disposed on the substrate; and a coplanar waveguide electrode structure on the buffer layer for receiving an electrical signal propagating therethrough with a second phase velocity to phase modulate the light in the optical waveguide. The substrate has a sufficiently small thickness so that coplanar mode-substrate mode coupling substantially does not occur, and the coplanar waveguide electrode structure has a sufficiently large thickness so that the first and second phase velocities are equal. The intensity modulator also includes a second optical waveguide which, in combination with the first optical waveguide, forms an interferometer.

Because of the use of two electro-optic interferometric modulators optically coupled in series, the present invention provides high port-to-port isolation. The modulators are preferably biased at quadrature, resulting in low IM distortion. Because the modulators have low drive voltage, the present invention has low conversion loss.

These and other objects, features and advantages of the present invention are described in or apparent from the following detailed description of preferred embodiments.

BRIEF DESCRIPTION OF THE DRAWINGS

The preferred embodiments will be described with reference to the drawings, in which like elements have been denoted throughout by like reference numerals, and wherein:

FIG. 3A illustrates an exemplary Z-cut LiNbO₃ substrate from which was derived the waveform for the TM₀(cond) substrate mode shown in FIG. 3.

FIG. 3B illustrates an exemplary X- or Y-cut LiNbO₃ substrate.

FIGS. 4A and 4B show electrical transmission ($S_{21}$) plotted against frequency for different substrate thicknesses of CPS devices.

FIGS. 4C and 4D show electrical transmission ($S_{21}$) plotted against frequency for different substrate thicknesses of CPW devices.

DETAILED DESCRIPTION OF THE PREFERRED EMBODIMENTS

Figure 1:
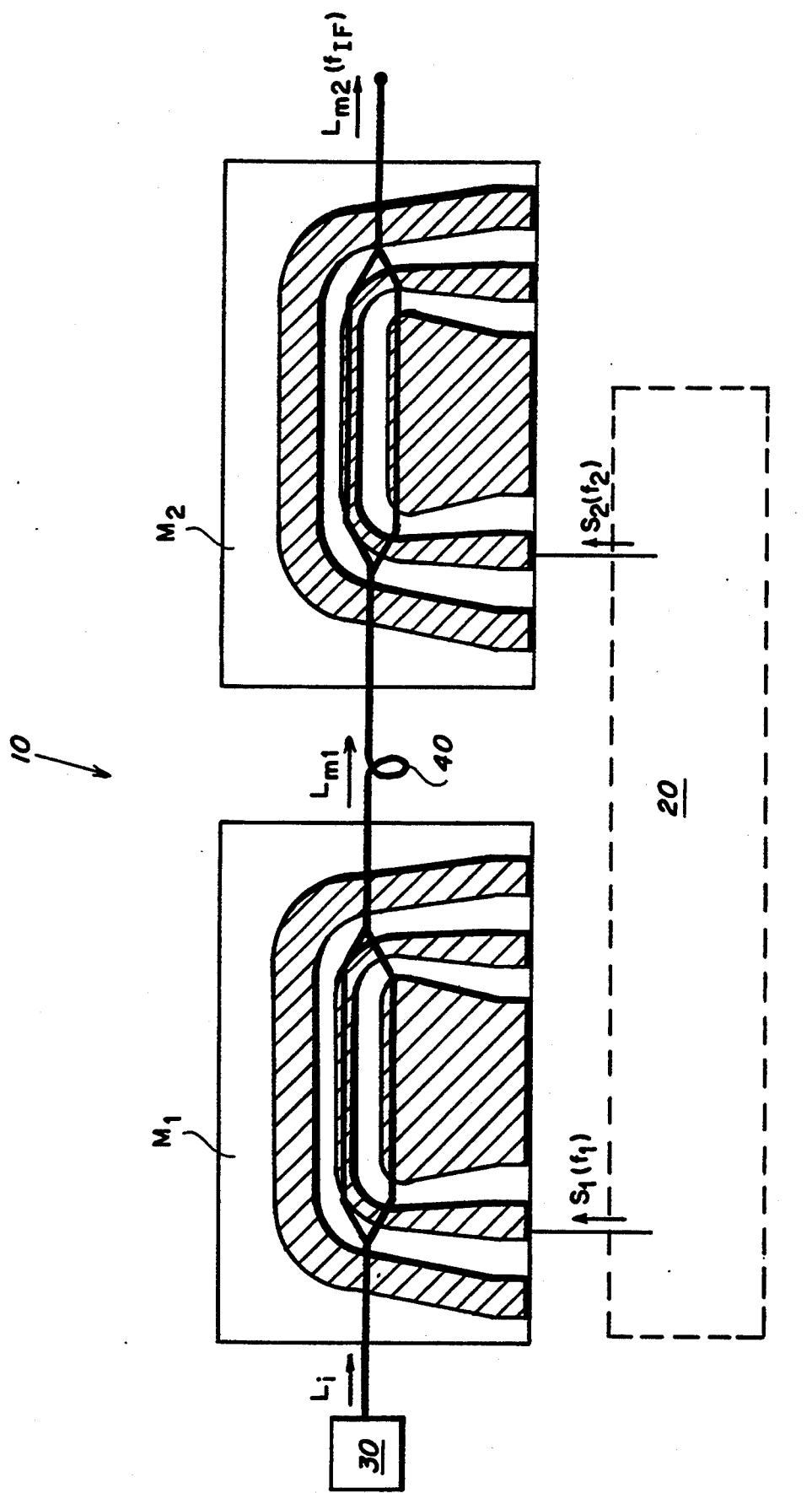
FIG. 1 shows in block diagram form an electro-optic mixer of the present invention.
Figure 11:
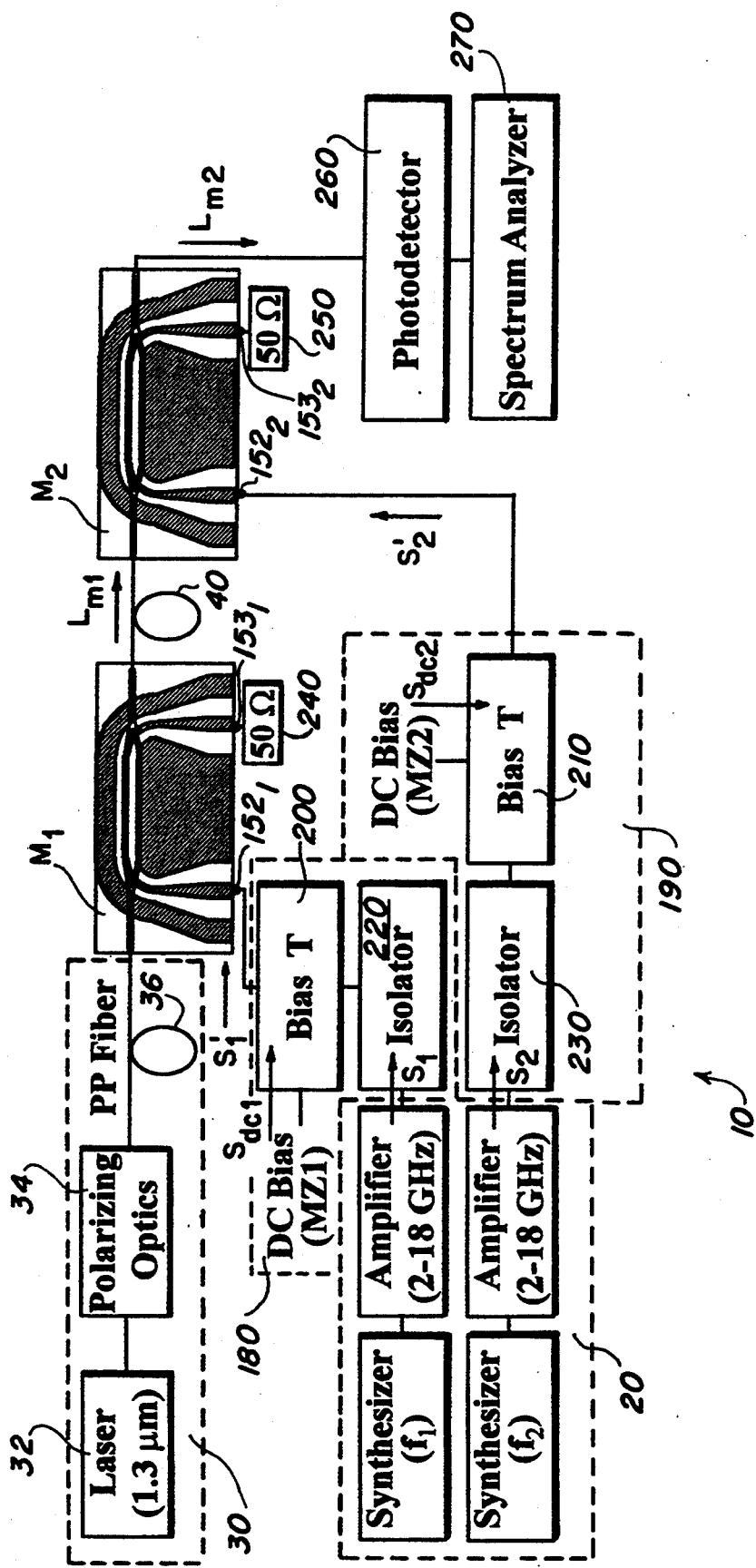
FIG. 11 shows in block diagram form an embodiment of the electro-optic mixer of FIG. 1 used in the examples herein.

Referring now to the drawings, FIGS. 1 and 11 show an electro-optic mixer 10. The mixer 10 includes means 20 for producing first and second microwave signals $S_1$ and $S_2$ having first and second frequencies $f_1$ and $f_2$, respectively. In other words, the first and second microwave signals $S_1$ and $S_2$ have first and second angular frequencies $\omega_1$ and $\omega_2$, respectively. A device 30 provides source light $L_i$. The device 30 preferably includes a cw laser 32, polarizing optics 34, and a polarization-preserving optical fiber 36 for producing, preferably, polarized light $L_i$, and most preferably, polarized cw laser light $L_i$.

The mixer 10 also includes first and second broadband, low drive voltage, traveling wave intensity modulators $M_1$ and $M_2$, respectively, which are described further below. The first modulator $M_1$ is responsive to the source light $L_i$ and to the first microwave signal $S_1$ for producing a first modulated optical signal $L_{m1}$. The mixer 10 further includes means 40 coupled between the first and second modulators $M_1$ and $M_2$, respectively for transmitting the first modulated signal $L_{m1}$ from the first modulator $M_1$ to the second modulator $M_2$. Since the modulators $M_1$ and $M_2$ are electrically decoupled, the isolation between their signal ports is almost infinite, making them attractive for microwave mixing. The transmitting means 40 is preferably, but not necessarily, polarization-maintaining means 40, such as polarization-maintaining optical fiber 40. The second modulator $M_2$ is cascade coupled to the first modulator $M_2$ and responsive to the first modulated signal $L_{m1}$ and to the second microwave signal $S_2$ for producing a second modulated optical signal $L_{m2}$ having a frequency component at the difference $|f_1-f_2|$ between the first and second frequencies $f_1$ and $f_2$, respectively. Such an embodiment of the mixer 10 would be useful for down-conversion. Alternatively, the second modulator $M_2$ is cascade coupled to the first modulator $M_2$ and responsive to the first modulated signal $L_{m1}$ and to the second microwave signal $S_2$ for producing a second modulated optical signal $L_{m2}$ having a frequency component at the sum $f_1+f_2$ of the first and second frequencies $f_1$ and $f_2$, respectively. Such an embodiment of the mixer 10 would be useful for up-conversion.

EXEMPLARY MODULATORS $M_1$ AND $M_2$

Figure 2A:
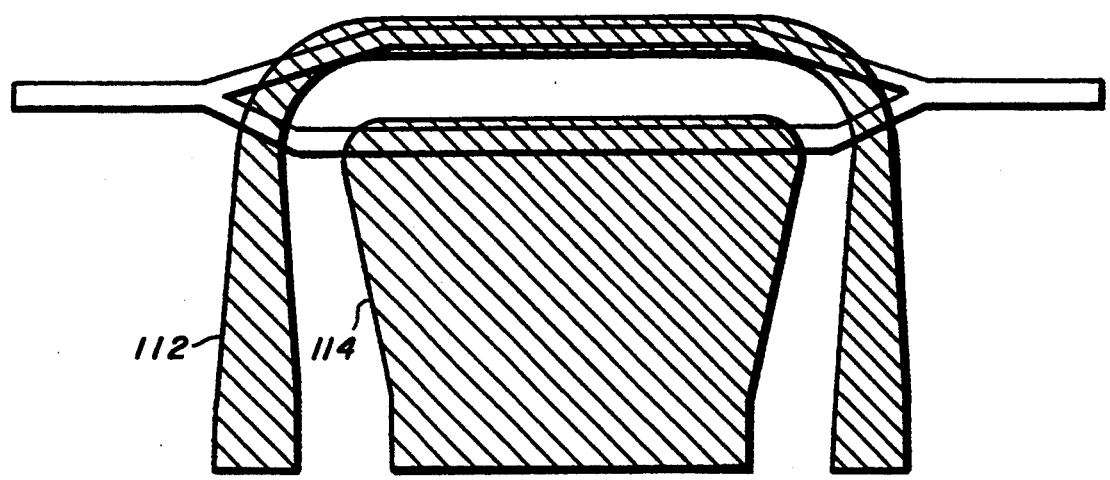
FIG. 2A illustrates a coplanar strip (CPS) electrode structure.
Figure 2B:
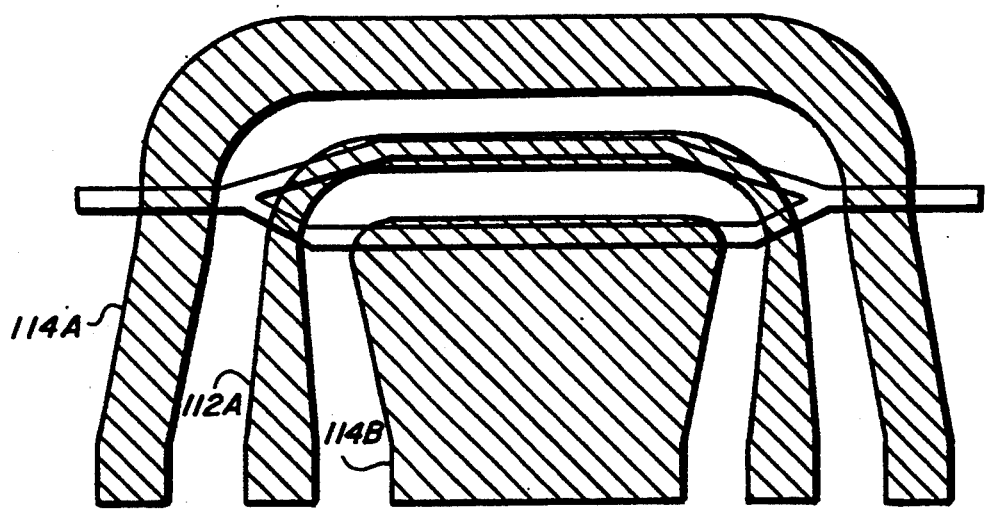
FIG. 2B illustrates a coplanar waveguide (CPW) electrode structure.

Referring now to FIGS. 2A and 2B, FIG. 2A illustrates an exemplary coplanar strip (CPS) electrode structure in an exemplary Mach Zehnder interferometer modulator, while FIG. 2B illustrates an exemplary coplanar waveguide (CPW) electrode structure in an exemplary Mach Zehnder interferometer modulator.

Physically the CPS electrode structure of FIG. 2A has a hot electrode 112, to which a modulating signal is applied (not shown), and a single ground plane or grounded electrode 114 on one side of the hot electrode 112. On the other hand, the CPW electrode structure of FIG. 2B has a hot central electrode 112A, to which a modulating signal, typically a microwave signal such as $S_1$ or $S_2$ (not shown) is applied, and two ground planes or grounded electrodes 114A and 114B on opposite sides of the hot central electrode 112A. The major physical difference between the CPS and CPW electrode structures is that the CPS electrode structure of FIG. 2A lacks a second ground plane or grounded electrode. This physical difference results in a crucial operational difference between the use of the coplanar strip (CPS) electrode structure of FIG. 2A and the use of the coplanar waveguide (CPW) electrode structure of FIG. 2B in an integrated optic modulator. The advantage of the CPW structure of FIG. 2B over the CPS structure of FIG. 2A will be explained by now referring to FIG. 3 and FIGS. 4A through 4D.

Figure 3:
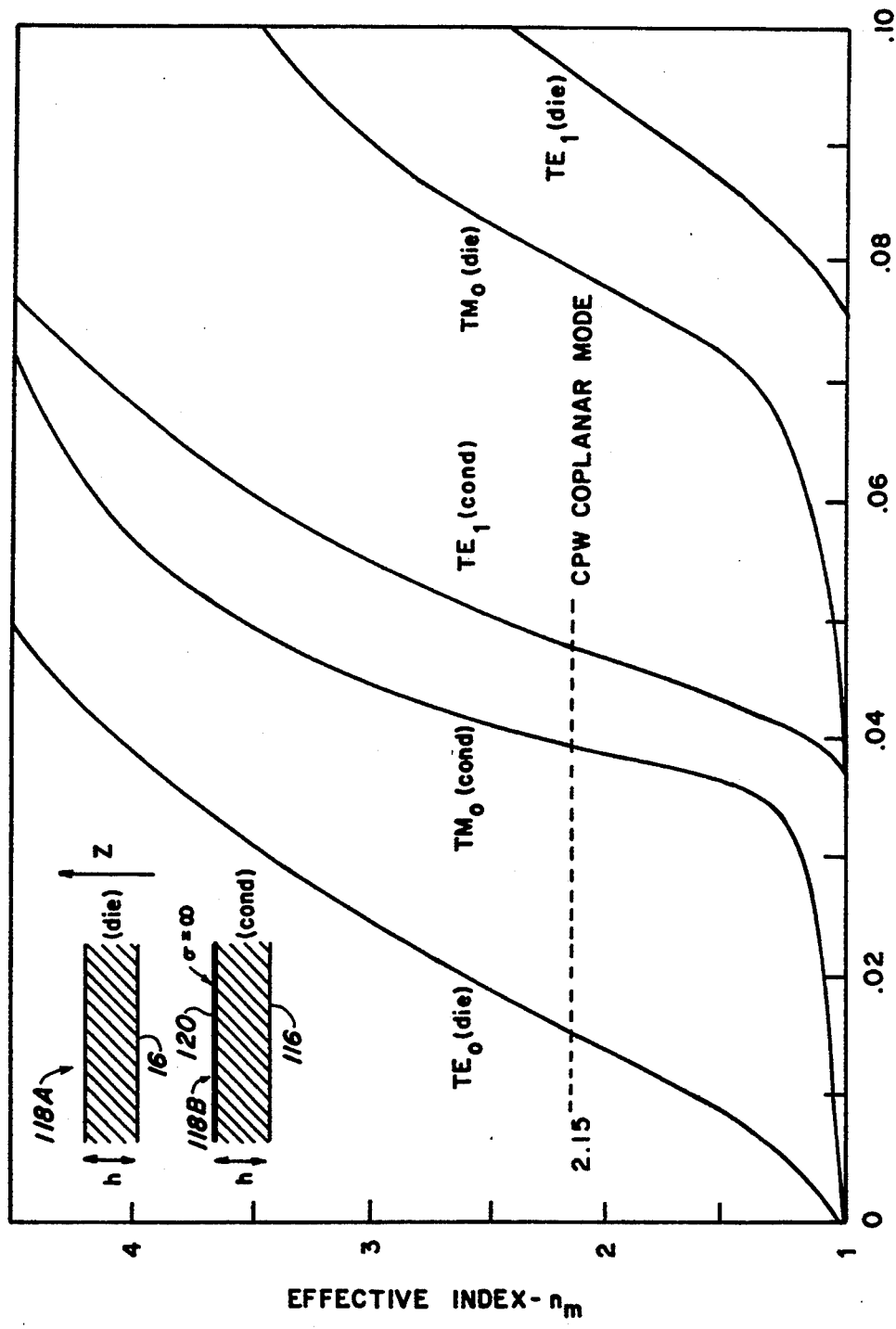
FIG. 3 illustrates dispersion curves for substrate modes of Z-cut lithium niobate (LiNbO$_3$) slabs or substrates.

FIG. 3 illustrates dispersion curves for substrate modes of Z-cut lithium niobate (LiNbO₃) slab (shown in inserts 118A and 118B), which LiNbO₃ slab represents a dielectric substrate 116, and where air (having an index=1) is the material under the LiNbO₃ substrate 116.

Two different conditions are shown in FIG. 3. One condition is with a metal coating 120 on the upper surface of the dielectric substrate 116, while the other condition is without the metal coating 120 on the upper surface of the dielectric substrate 116. The effective index $n_m$ of the guided modes of the Z-cut LiNbO3 slab is plotted against the ratio of $h/\lambda_0$, where h is the substrate 116 thickness and $\lambda_0$ is the free space wavelength.

Shown in FIG. 3 are five substrate modes, respectively labeled $TE_0$(die), $TM_0$(cond), $TE_1$(cond), $TM_0$(die) and $TE_1$(die), where:

$TE_0$ (transverse electric) means that the electric field is parallel to the plane of the slab (and the magnetic field is perpendicular to the plane of the slab), $TM_0$(cond) represents the $TM_0$(cond) substrate mode for a Z-cut LiNbO3 substrate 116, $TE_1$(cond) represents the $TE_1$(cond) substrate mode for a Z-cut LiNbO3 substrate 116.

the subscripts 0 and 1 refer to the order of the substrate mode, with 0 and 1 respectively representing the first order mode and the second order mode, (die) represents an approximation of the CPS structure based on the assumption that substantially no metal is disposed on the top of the dielectric substrate 116, (cond) represents the CPW structure where metal 120 (a conductor) is disposed on the top of the dielectric substrate 116, 2.15=the optical index in LiNbO3 at a wavelength of 1.3 micrometer ($\mu$m), h=the thickness of the substrate 116, $\lambda_0$=free space microwave wavelength, $n_m = n_m$(subs)=the effective index of substrate mode, and $n_m$(CPW)=the effective index of the CPW coplanar mode (which for Z-cut LiNbO3=2.15 at 1.3 $\mu$m when optical-microwave phase match is achieved).

It has been known in the prior art that microwave leakage (loss dips in transmission) is due to a microwave coupling between the coplanar mode and a substrate mode bounded by the top and bottom surfaces of the substrate 116. In microwave terminology this is called a surface wave. However, for purposes of this description, the optical terminology of a substrate mode will be used. Although this microwave coupling has been known in the microwave area, it apparently has not been appreciated in the optical modulator area. The frequency at which the microwave coupling, and thus the microwave loss, begins depends on the thickness of the substrate 116 and the dispersion behavior of the substrate mode. It is here where there is a crucial difference between the use of the coplanar strip (CPS) electrode structure of FIG. 2A and the use of a coplanar waveguide (CPW) electrode structure of FIG. 2B. It should be recalled that the CPW structure of FIG. 2B has ground planes 114A and 114B on both sides of the central electrode 112A, whereas the CPS structure of FIG. 2A has a ground plane 114 on only one side of the electrode 112. The dispersion curves for the Z-cut LiNbO3 substrate 116 (shown in inserts 118A and 118B of FIG. 3) are different, depending on whether the upper surface of a substrate 116 is coated with the metal 30 (insert 118B) or is not coated with the metal 120 (insert 118A).

FIG. 3 shows that the $TE_0$(die) substrate mode of the non-metal coated substrate 116 of insert 118A occurs at a lower frequency than for the $TM_0$(cond) substrate mode of the metal coated substrate 116 of insert 118B. From FIG. 3, it can be determined that the coplanar mode-substrate mode coupling problem can be solved by using a thick electrode CPW structure (wherein the metal of the thick electrode CPW structure substantially coats the entire top surface) and by making the substrate thickness sufficiently thin that microwave leakage will not occur within the bandwidth of interest. The required thickness of the electrode structure for optical-microwave phase match can be calculated separately by known techniques (to be discussed later).

As stated before, the dispersion curves shown in FIG. 3 apply to the specific cases where Z-cut slabs or substrates of LiNbO3 are utilized and air is the material underneath each of the LiNbO3 substrates 116. In these cases the effective index ($n_m$) of the CPW coplanar mode is adjusted to be close to 2.15.

It will be recalled that microwave leakage (loss dips in transmission) is due to a microwave coupling between the coplanar mode and a substrate mode bounded by the top and bottom surfaces of the substrate 116. To avoid such microwave leakage it is important that the substrate thickness h be sufficiently small at a given $\lambda_0$ so that the following equation is satisfied:

$$n_m(\text{subs}) \leq n_m(\text{CPW}) \qquad (1)$$

which for Z-cut LiNbO3 the $n_m$(CPW)$\approx$2.15 at a wavelength of 1.3 $\mu$m when optical-microwave phase match is achieved.

Since h and $\lambda_0$ are known, $h/\lambda_0$ can be readily calculated and then the effective index of the substrate mode $n_m$(subs) can be determined from the dispersion curves in FIG. 3. For example, if $h/\lambda_0$=0.04, then the effective index $n_m$(subs) of the $TM_0$(cond) substrate mode for the Z-cut LiNbO3 substrate 116 would be about 2.5. Since $n_m$(CPW)=2.15 and $n_m$(subs)=2.5, $n_m$(subs) would not be $\leq n_m$(CPW) and therefore microwave losses would result when $h/\lambda_0$=0.04. To prevent such a microwave loss, h (the substrate thickness) would have to be thinned until the relationship shown in Equation (1) is satisfied across a desired bandwidth. When this relationship is satisfied, substantially no microwave leakage occurs across that desired bandwidth.

There are several steps that have to be taken to determine the geometry of the broadband, travelling wave, electro-optic integrated optical modulator of the present invention which contains the thick electrode coplanar (CPW) structure on a thin substrate. After the optical index is determined:

1. The coplanar microwave index has to be made equal to the optical index (to be explained in discussion of FIG. 9), and 2. Then the substrate must be thinned so that the effective index (or microwave index) of the substrate mode is less than or equal to the effective index (or microwave index) of the CPW coplanar mode. (See Equation (1).)

Referring to FIGS. 3A and 3B, it will now be explained how the proper thickness can be determined for any suitable Z-cut substrate 119A and for any suitable X- or Y-cut substrate 119B, with each of the substrates 119A and 119B having a metal coating 120 on the upper surface of the substrate. For a more universal application, the following Equations (2) and (3) will also be used in this explanation instead of the dispersion curves of FIG. 3.

Equations for Leaky Mode Loss

For the Z-cut case: ($TM_0$(cond)):

$$\frac{h}{\lambda_0} = \frac{\tan^{-1}\left[\frac{n_e n_0}{n_3^2}\left(\frac{n_m^2 - n_3^2}{n_e^2 - n_m^2}\right)^{\frac{1}{2}}\right]}{2\pi\left(\frac{n_0}{n_e}\right)(n_e^2 - n_m^2)^{\frac{1}{2}}} \quad (2)$$

For the X- or Y-cut case: ($TM_0$(cond)):

$$\frac{h}{\lambda_0} = \frac{\tan^{-1}\left[\frac{n_e n_0}{n_3^2}\left(\frac{n_m^2 - n_3^2}{n_0^2 - n_m^2}\right)^{\frac{1}{2}}\right]}{2\pi\left(\frac{n_e}{n_0}\right)(n_0^2 - n_m^2)^{\frac{1}{2}}} \quad (3)$$

where:
h = substrate thickness
$\lambda_0$ = free space microwave wavelength
$n_0$ = ordinary index of substrate
$n_e$ = extraordinary index of substrate
$n_m$ = effective index of substrate mode
$n_3$ = index of material below substrate Each of the substrates 119A and 119B respectively utilized in FIGS. 3A and 3B is a uniaxial crystal which has two indices of refraction, one for fields parallel to Z and the other for fields parallel to X or Y. The Equations (2) and (3) are for the two different orientations of the uniaxial crystal substrates shown in FIGS. 3A and 3B. More particularly, Equation (2) is for the Z-cut orientation shown in FIG. 3A, while Equation (3) is for the X- or Y-cut orientation shown in FIG. 3B. In addition, Equation (2) determines the ratio $h/\lambda_0$ as a function of the effective index $n_m$ for the $TM_0$(cond) substrate mode for the Z-cut substrate being used. In a similar manner, Equation (3) determines the ratio $h/\lambda_0$ as a function of the effective index $n_m$ for the $TM_0$(cond) substrate mode for the X- or Y-cut substrate being used.

Assuming that Equation (2) is being utilized during the implementation of the Z-cut substrate for an electro-optic integrated optical modulator of the invention, then the effective index of the CPW coplanar mode $n_m$(CPW) would be known. In addition, the values h, $\lambda_0$, $n_0$, $n_e$ and $n_3$ in Equation (2) would also be known. Only $n_m$ or $n_m$(subs), the effective index of the $TM_0$(cond) substrate mode, would not be known. By inserting the known values of h, $\lambda_0$, $n_0$, $n_e$ and $n_3$ into Equation (2), the remaining value of $n_m$(subs) can be determined and compared with $n_m$(CPW), the effective index of the CPW coplanar mode, to see if the relationship shown in Equation (1) [$n_m$(subs)$\leq n_m$(CPW)] is satisfied. If the relationship is satisfied, then the substrate is thin enough. If the relationship is not satisfied, then h must be thinned until Equation (1) is satisfied.

In a similar manner, if Equation (3) is being utilized during the implementation of the X- or Y-cut substrate for an electro-optic integrated optical modulator of the invention, then the effective index of the CPW coplanar mode $n_m$(CPW) would be known. In addition, the values h, $\lambda_0$, $n_0$ and $n_3$ in Equation (3) would also be known. Only $n_m$ or $n_m$(subs), the effective index of the $TM_0$(cond) substrate mode, would not be known. By inserting the known values of h, $\lambda_0$, $n_0$ and $n_3$ into Equation (3), the remaining value of $n_m$(subs) can be determined and compared with $n_m$(CPW), the effective index of the CPW coplanar mode, to see if the relationship shown in Equation (1) [$n_m$(subs)$\leq n_m$(CPW)] is satisfied. If the relationship is satisfied, then the substrate is thin enough. If the relationship is not satisfied, then h must be thinned until Equation (1) is satisfied.

In an earlier experiment, a 10 μm thick electrode CPW structure and a 14 μm thick electrode CPS structure were each fabricated on Z-cut $LiNbO_3$ slabs or substrates 116 with a 0.9 μm thick $SiO_2$ buffer layer on the substrate. Hot electrode widths were 8 μm, gap widths between a hot electrode and its associated ground plane(s) were 15 μm, and ground planes were 2–3 millimeters (mm) wide. Finite element calculations indicated that those geometries should result in microwave indices near 2.4. These devices were fabricated on substrates 0.5 and 0.25 mm thick and 8 mm wide. The electrode interaction length was 2–4 cm.

The devices were tested on a Hewlett-Packard HP-8510C automatic network analyzer with the electrical transmission ($S_{21}$) shown in FIGS. 4A, 4B, 4C and 4D. The CPS devices showed loss dips beginning at 7 gigahertz (GHz) for the device with the 0.5 mm thick substrate and at 14 GHz for the device with the 0.25 mm thick substrate. The CPW devices showed similar behavior at about 24 GHz for the device with the 0.5 mm thick substrate, but no significant dips at all out to 40 GHz for the device with the 0.25 mm thick substrate. The frequency at which mode coupling begins is referred to as $f_c$. For frequencies above $f_c$, it was verified that microwave power was transmitted to the outer edge of the substrate (parallel to the axis of the device) by perturbing the field at the edge with another slab of $LiNbO_3$, or by sawing off the edge and thus reducing the width of the substrate. These actions had the effect of changing the position of the loss dips with frequency but did not significantly affect $f_c$. Power was observed at the outer edge of the substrate all along the length of the device. The experimental results (Experiment) for $f_c$ for several devices of each type are listed in the following TABLE, along with computed (Model) values from FIG. 3 assuming $n_m$=2.4.

TABLE

SUMMARY OF COMPUTED AND MEASURED FREQUENCIES

| Device | h (mm) | Substrate mode | $f_c$ (GHz) Model | $f_c$ (GHz) Experiment |
|---|---|---|---|---|
| CPW | 0.5 | $TM_O$ (cond) | 25 | 24–26 |
|  | 0.25 | $TM_O$ (cond) | 49 | >40 |
| CPS | 0.5 | $TE_O$ (die) | 11 | 7–8 |
|  | 0.25 | $TE_O$ (die) | 22 | 14–16 |

Thus, as shown in FIGS. 4A and 4C (or FIGS. 4B and 4D) and the TABLE, for the same thickness substrate the CPS structure shows in FIG. 4A (FIG. 4B) microwave leakage (loss dips in transmission) at lower frequencies than the CPW structure shows in FIG. 4C (FIG. 4D).

Figure 5:
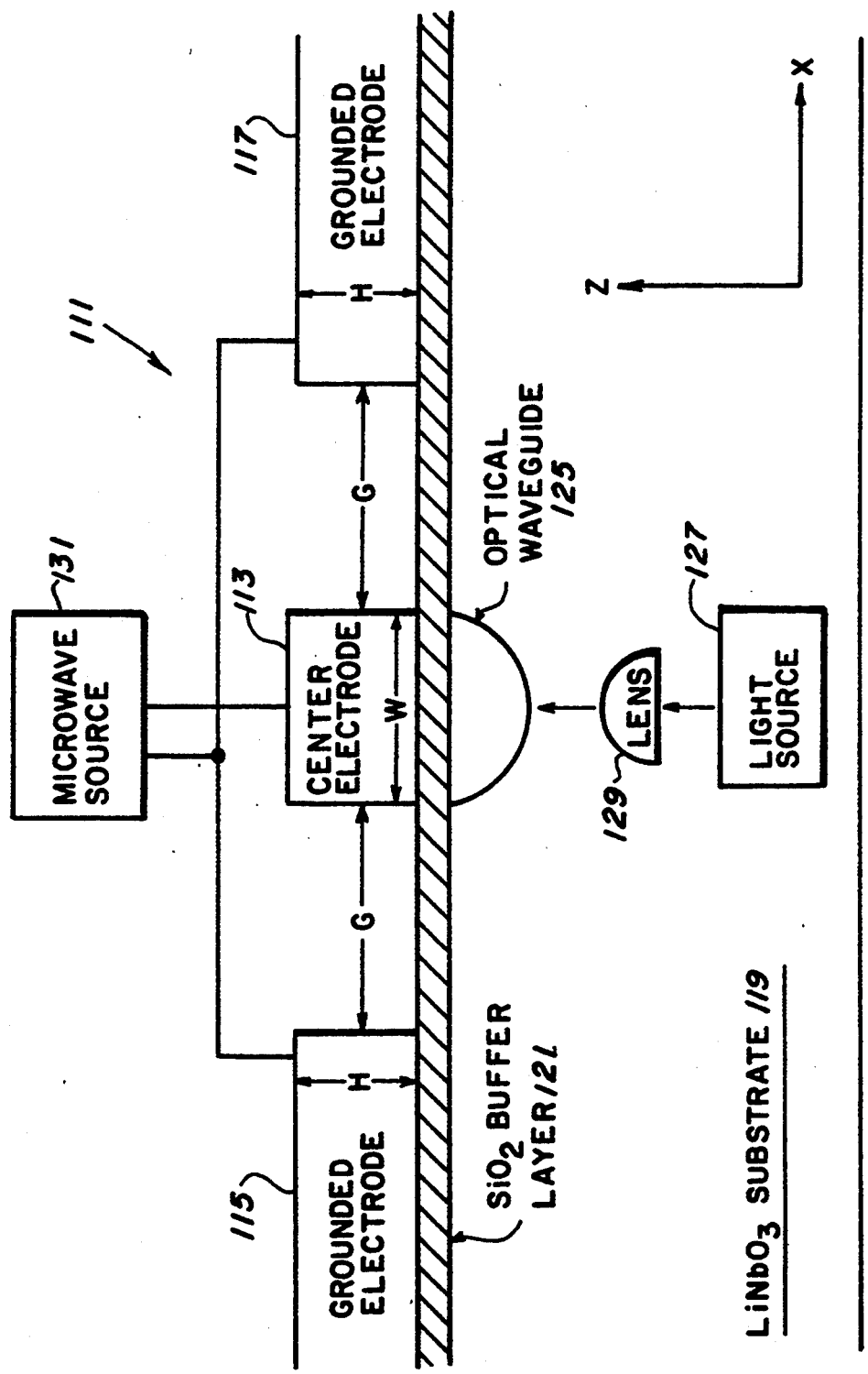
FIG. 5 illustrates a cross section of a phase modulator with coplanar waveguide electrodes.
Figure 6:
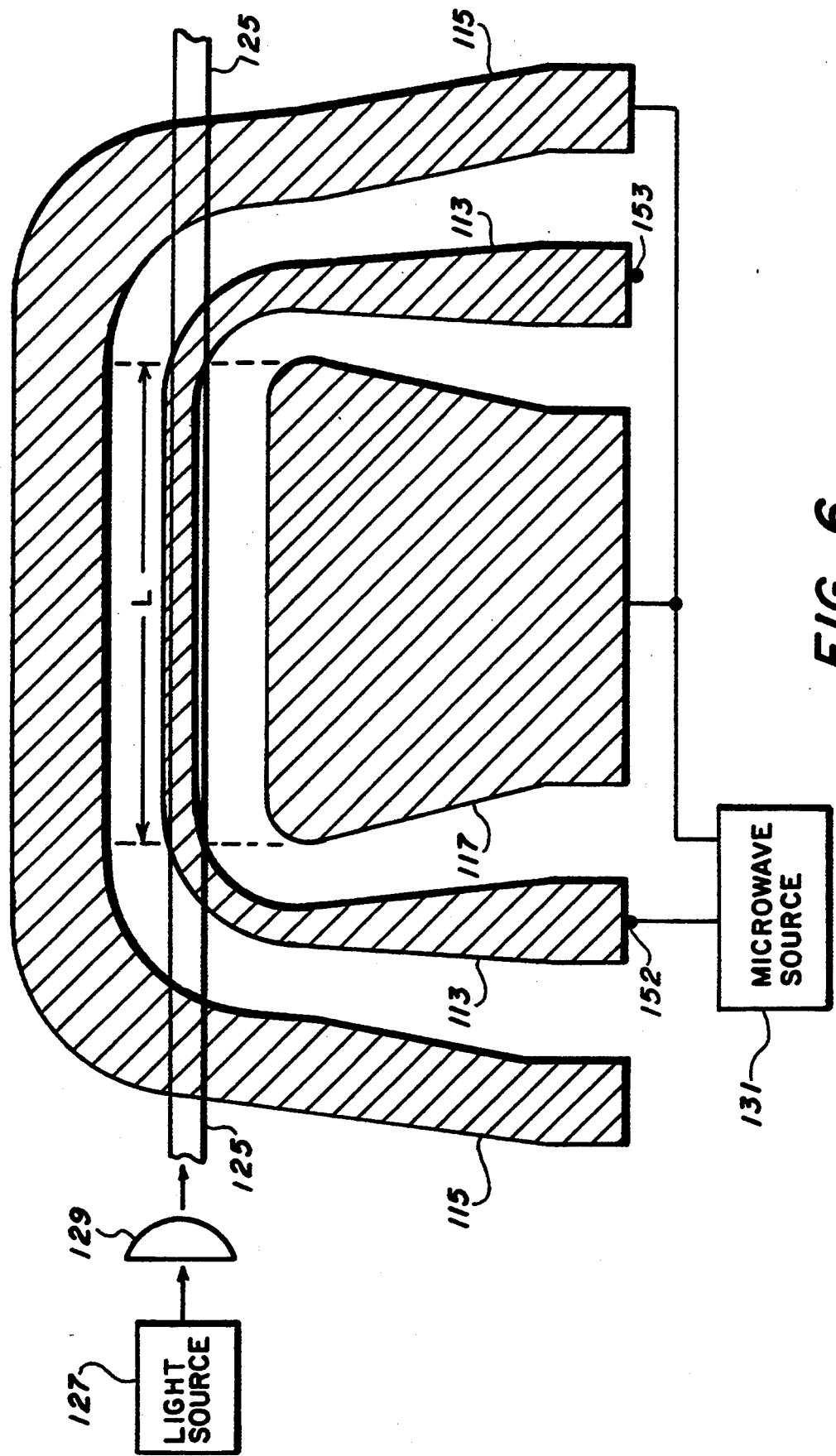
FIG. 6 illustrates a top view of the phase modulator of FIG. 5.

FIG. 5 and 6 respectively show cross-sectional and top views of a high speed phase modulator with coplanar electrodes.

In the phase modulator of FIGS. 5 and 6, a coplanar waveguide (CPW) structure 111, comprised of a center electrode 113 and ground planes or grounded electrodes 115 and 117 on both sides of the center electrode 113, is disposed on a thin substrate 119 of Z-cut lithium niobate ($LiNbO_3$) to avoid electrical leakage. Preferably the substrate 119 has a thickness of from 0.16 to 0.24 mm and a width of about 8 mm.

The electrodes 113, 115 and 117 are preferably made of gold and have thicknesses of from 10–20 μm and electrode 113 has an exemplary width of substantially 8 μm. The gap width G between the center electrode 113 and each of the grounded electrodes 115 and 117 is selected to be about 15 μm, while the grounded electrodes 115 and 117 are selected to be about 2–3 mm wide.

The substrate 119 has electro-optic effects, and is coated with an exemplary silicon dioxide (SiO$_2$) buffer layer 121 having an exemplary thickness of substantially 0.9 μm. In addition, the substrate 119 contains an optical waveguide 125 underneath the electrode 113. The optical waveguide 125 is formed by depositing a strip of titanium (Ti) metal on the surface of the LiNbO$_3$ substrate 119 and diffusing it into the LiNbO$_3$ substrate 119 at high temperature by techniques well known in the art. This is done before the SiO$_2$ buffer layer 121 and the electrodes 113, 115 and 117 are deposited. Portions of the electrodes 113, 115 and 117 extend in parallel paths over an electrode interaction region of length L (to be explained) which is parallel to the optical waveguide 125. The silicon dioxide buffer layer 121 isolates the optical field in the optical waveguide 125 from the metal electrodes 113, 115 and 117 of the coplanar waveguide structure 111 to prevent optical loss.

Figure 9:
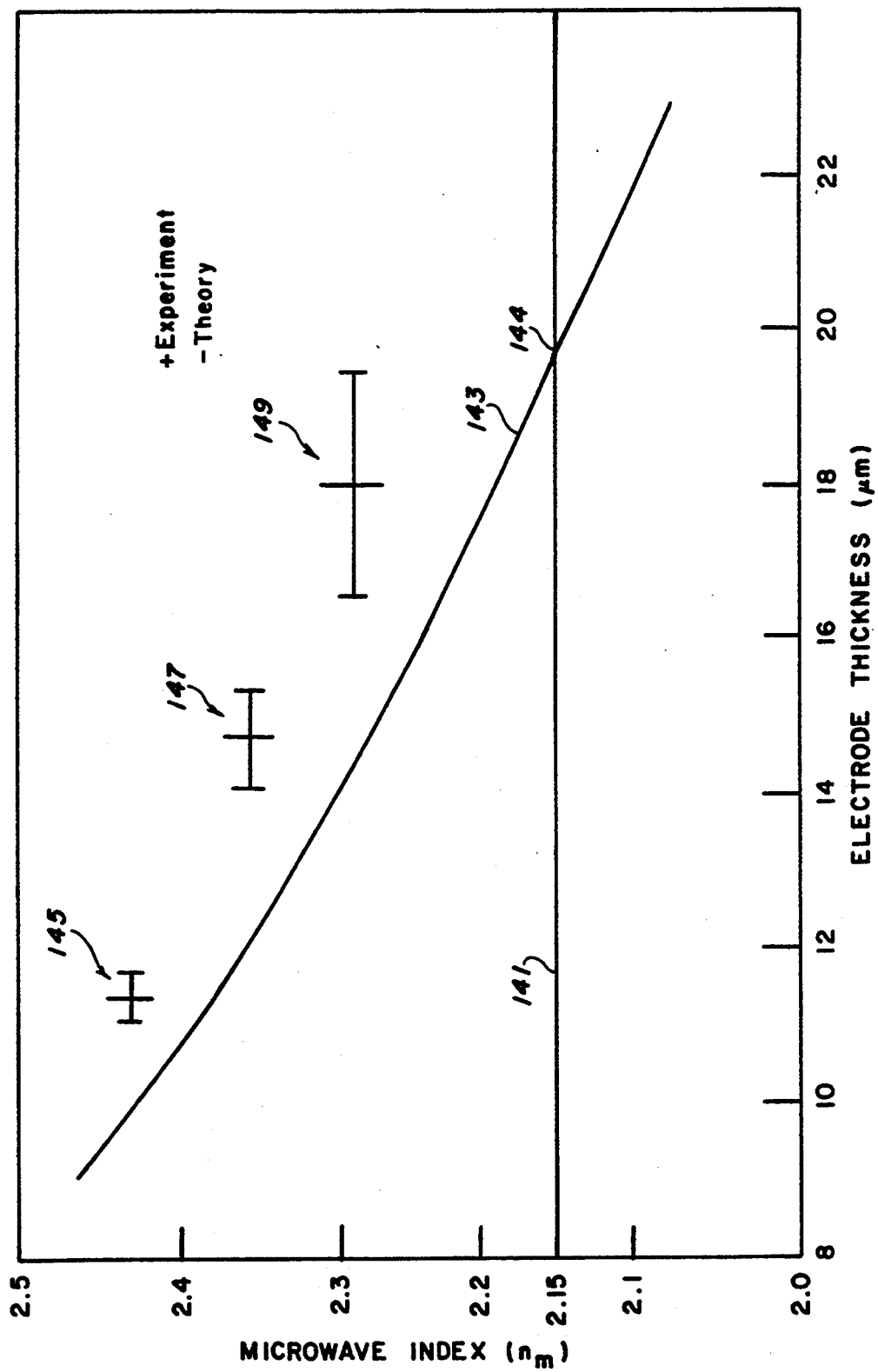
FIG. 9 illustrates a plot of the microwave index $n_m$ against electrode thickness, and a comparison of theoretical results with experimental results.

It should be noted that the phase modulator of FIGS. 5 and 6 was fabricated with the above-specified geometries for operation at an exemplary 1.3 μm. Calculations have indicated that these above-specified geometries should result in microwave indices $n_m$ between about 2.2 and about 2.4, as shown in FIG. 9 (to be explained).

In operation, 1.3 μm light from a light source 127, such as a laser, is focused by a lens 129 into the optical waveguide 125 and propagates through the optical waveguide 125. At the same time, a modulating microwave drive signal, at an arbitrary amplitude of up to 4 to 5 volts peak and at a frequency in the range from 0 Hz up to substantially 40 GHz, is applied from a microwave source 131 to the coplanar waveguide structure 111 (between an input port 152 on the center electrode 113 and each of the grounded electrodes 115 and 117) and on the same side of the optical modulator as the exemplary 1.3 μm light is transmitted into the optical waveguide 125. The center electrode 113 also includes an output port 153 for termination of the coplanar waveguide structure 111. The low drive voltage of up to 4 to 5 volts peak results in a highly efficient optical modulator. This modulating drive signal modulates the phase of the propagating light or optical wave at the frequency of the microwave drive signal. More particularly, the optical phase modulation results from an interaction between the optical wave in the optical waveguide 125 and the microwave drive signal in the coplanar waveguide structure 111.

The bandwidth of the phase-modulated optical signal is typically limited by optical-microwave phase mismatch (wherein the microwave wave and the optical wave travel at different velocities, depending on the design of the device). The phase matching or phase velocity matching in the invention will now be discussed.

Since the microwave drive signal and the light waves are both applied on the same side of the optical modulator, the microwave signal and the light waves propagate in the same direction through the electrode interaction region of the modulator. The direction of propagation for both the light waves and the microwave field is into the paper in FIG. 5, and from left to right in FIG. 6.

The coplanar waveguide structure 111 is designed with the above-discussed geometries so that the microwave field and the light waves propagate with substantially the same phase velocity when the light has a wavelength of about 1.3 μm. When the microwave field and the light waves have the same or matching phase velocities, the phase modulator of FIGS. 5 and 6 has the best broadband response characteristics.

The phase velocity match is determined by the effective indices of the optical and microwave field modes. The effective index of the optical mode is fixed by the index of refraction of the substrate 119. The effective index of the microwave field in the coplanar waveguide structure is determined by the geometry of the electrode structure of the optical modulator of FIGS. 5 and 6, the width W of the center electrode 113, the gap G between the center electrode 113 and each of the grounded electrodes 115 and 117, the height H and geometry of the electrodes 113, 115 and 117, the material and the dielectric constants of the buffer layer 121 and the substrate 119, and the thickness of the silicon dioxide buffer layer 121. These parameters are selected to make the effective index of the microwave field mode as close as possible to the effective index of the optical mode.

Of particular importance in producing a phase velocity match in the invention is the use of a thick electrode structure (of from 10–20 μm) on a coplanar waveguide (CPW) structure 111 (wherein the metal of which substantially coats the entire top surface of the buffer layer-coated substrate 119, as indicated in FIGS. 5 and 6) and the use of a substrate 119 having a thickness sufficiently thin (preferably of from 0.16 to 0.24 mm) so that microwave leakage will substantially not occur within the bandwidth of interest (up to 40 GHz).

Figure 7:
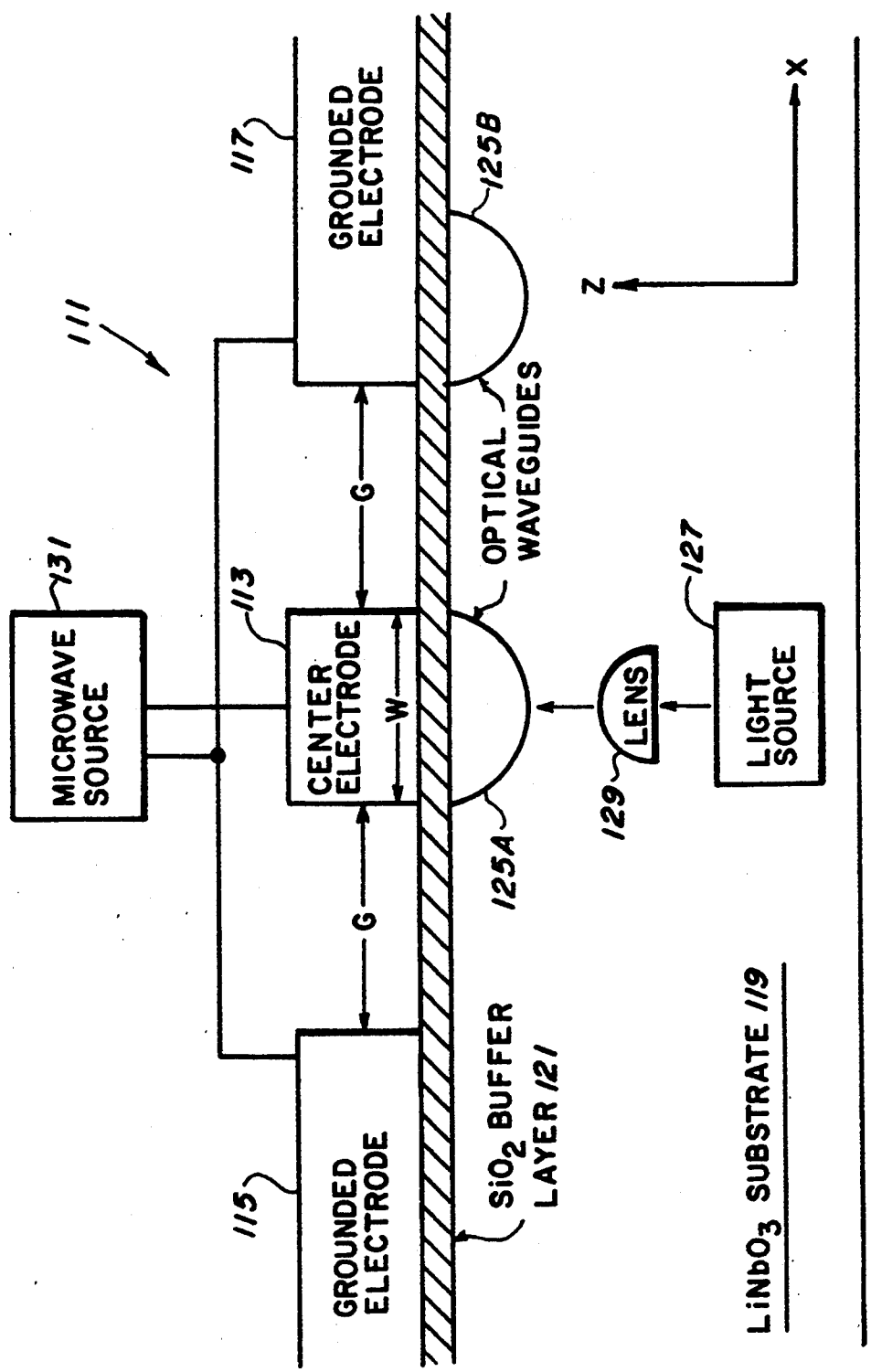
FIG. 7 illustrates a cross section of an intensity modulator with coplanar waveguide electrodes on a Mach-Zehnder interferometer.
Figure 8:
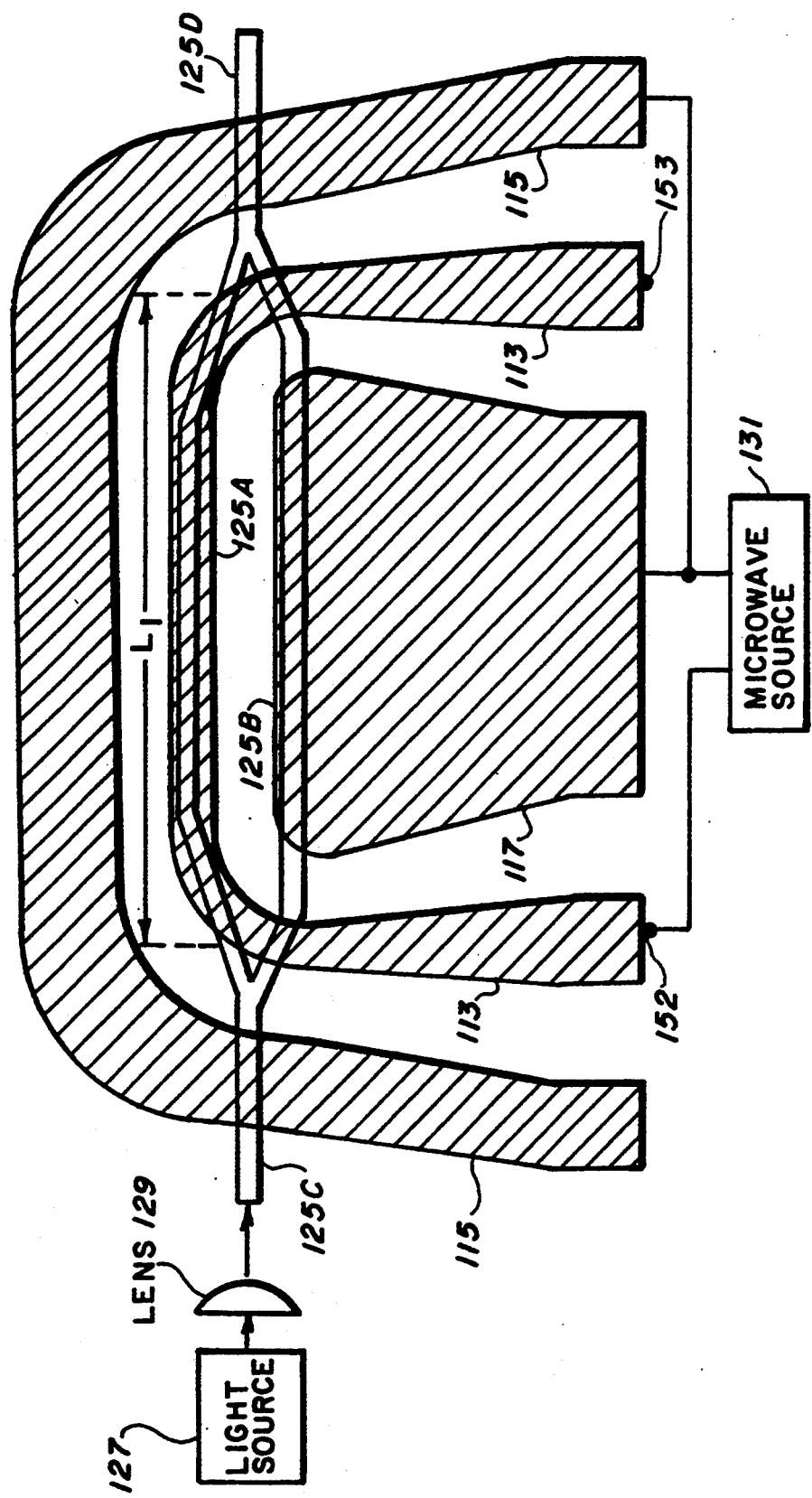
FIG. 8 illustrates a top view of the intensity modulator of FIG. 7.

Referring now to FIGS. 7 and 8, FIGS. 7 and 8 respectively show cross-sectional and top views of a high speed intensity modulator with coplanar electrodes. This design is the exemplary design for the intensity modulators M$_1$ and M$_2$ used in the mixer 10 of FIG. 1. FIGS. 7 and 8 are respectively substantially the same as FIGS. 5 and 6, except that they are cross-sectional and top views of a high speed Mach Zehnder interferometer modulator instead of just the phase modulator of FIGS. 5 and 6. The Mach Zehnder interferometer modulator of FIGS. 7 and 8 produces an intensity modulation at its output.

The Mach-Zehnder interferometric modulator of FIGS. 7 and 8 is fabricated in a manner similar to the fabrication of the phase modulator of FIGS. 5 and 6. More particularly, the Mach-Zehnder interferometer is used with a coplanar waveguide (CPW) structure 111 on a thin substrate 119 of z-cut LiNbO$_3$ to avoid electrical leakage. The thickness of gold electrodes 113, 115 and 117 are varied from 10–20 μm. The substrate 119 is coated with a 0.9 μm SiO$_2$ buffer layer 121. The widths of the electrode 113 is 8 μm, the gap widths G are 15 μm and the ground planes 115 and 117 are 2–3 mm wide. In addition, the optical waveguide 125 of FIG. 5 is replaced by optical waveguide arms 125A and 125B respectively disposed in the substrate 119 respectively underneath the center electrode 113 and the ground plane or grounded electrode 117, as shown in FIG. 7. The optical waveguide arms 125A and 125B are formed by selectively applying strips of Ti metal on the surface of the LiNbO$_3$ substrate 119 and diffusing them into the LiNbO₃ substrate at room temperature by techniques well known in the art. This is done before the SiO₂ buffer layer 121 and the electrodes 113, 115 and 117 are deposited on the substrate 119.

The optical waveguide arms 125A and 125B are optically coupled together at one end to an input waveguide 125C and at a second end to an output waveguide 125D to form a Mach-Zehnder interferometer configuration, as shown in FIG. 8.

It should be noted that the FIGS. 5–8 are shown for a Z-cut LiNbO₃ substrate, where the Z-axis is normal to the plane of the LiNbO₃ substrate. (See insert 118A in FIG. 3.) For an X- or Y-cut LiNbO₃ substrate 119 in FIG. 5, the optical waveguide 125 would be similarly formed in the substrate 119 (as discussed before), but it would be located between the center electrode 113 and one of the grounded electrodes 115 and 117. Similarly, for an X- or Y-cut LiNbO₃ substrate 119 in FIG. 7, the optical waveguide arms 125A and 125B would be similarly formed in the substrate 119 (as discussed before), but the waveguide arm 125A would be located between the center electrode 113 and the grounded electrode 115, while the waveguide arm 125B would be located between the center electrode 113 and the grounded electrode 117.

The operation of the embodiment of FIGS. 7 and 8 is substantially the same as the operation of the embodiment of FIGS. 5 and 6, with the following exceptions. Light at the exemplary 1.3 μm wavelength applied to optical waveguides 125A and 125B is preferably polarized light with orientation appropriate to the type of substrate and to the type of cut (such as X-cut, Y-cut or Z-cut). For example, an intensity modulator using a z-cut LiNbO₃ substrate 119 provides optimal response to vertical polarized light. The light from the light source 127 is most preferably cw laser light. It may be focused by the lens 129 into the input waveguide 125C or may be transmitted via an optical fiber, preferably a polarization-maintaining fiber. The light from the light source 127 is divided into the optical waveguide arms 125A and 125B of the interferometer. At the same time, a modulating microwave drive signal, at an arbitrary amplitude of up to the drive voltage $V_\pi$ and at a frequency in a preselected range, is applied from the microwave source 131 to the coplanar waveguide structure 111 (between the input port 152 on the center electrode 113 and each of the grounded electrodes 115 and 117) and on the same side of the optical modulator as the exemplary 1.3 μm light is transmitted into the optical waveguide 125. The center electrode 113 also includes an output port 153 for termination of the coplanar waveguide structure 111. As discussed further below, the drive voltage $V_\pi$ is also known as the half-wave voltage $V_\pi$, which is the change in microwave voltage applied to the input port 152 which results in phase reversal, i.e. phase shift by a half-wave, i.e. phase shift by $\pi$ radians. The half-wave voltage $V_\pi(f)$ generally increases with frequency of the applied microwave signal and is typically on the order of no more than 4 to 5 volts for DC. The preselected frequency range can be as high as from 0 Hz up to substantially 40 GHz.

The modulating drive signal modulates the light or optical waves in the waveguide arms 125A and 125B. The light in the two arms 125A and 125B is phase shifted in opposite directions before it is recombined in the output waveguide 125D to produce an output beam which contains intensity or amplitude modulation. It is the modulating microwave drive signal which modulates the intensity of the light in the interferometer at the frequency of the microwave drive signal. More particularly, the optical intensity or amplitude modulation results from an interaction between the optical wave in the optical waveguides 125A and 125B and the microwave drive signal in the coplanar waveguide structure 111.

The object of velocity matching in the invention is to implement the optical phase modulator of FIGS. 5 and 6 or the optical intensity modulator of FIGS. 7 and 8 so as to cause the velocity of the microwave wave to be the same as or substantially equal to the velocity of the optical wave. That will result in an improved optical response for the optical modulator. The velocity of the optical wave is the velocity of light divided by the optical index, while the velocity of the microwave wave is the velocity of light divided by the microwave index.

Three different optical modulator devices were fabricated on substrates 119 that were 0.16–0.25 mm thick and 8 mm wide and with the remaining geometries specified above for the embodiment of FIGS. 7 and 8. More specifically, as indicated in FIG. 9, the thicknesses of the electrodes 113, 115 and 117 on each of the substrates 119 (and the associated microwave indices) of the three above-noted optical modulators were about 11.5 μm (and about 2.44 $n_m$), about 14.6 μm (and 2.37 $n_m$) and about 18 μm (and about 2.29 $n_m$). The electrode interaction length $L_1$ (FIG. 8) was 24 mm. Finite element calculations indicated that these geometries should result in microwave indices $n_m$ between 2.2 and 2.4, as shown in FIG. 9. FIG. 9 will now be discussed.

FIG. 9 illustrates a plot of the CPW microwave index $n_m$ against electrode thickness, and a comparison of theoretical results with experimental results. More specifically, FIG. 9 shows the optical index at 2.15, as represented by the horizontal line 141. FIG. 9 also shows a calculated version of a coplanar waveguide microwave (or effective) index of the CPW coplanar mode, as represented by the sloping line 143, as a function of the thickness of the electrodes 113, 115 and 117 for the above-specified geometries. FIG. 9 also shows three data points 145, 147 and 149 for the above-noted three fabricated devices of different electrode thicknesses. Note that the microwave index of each of these data points 145, 147 and 149 decreases as the associated electrode thickness increases. So FIG. 9 shows how well each of the three devices is velocity matched. Note that the line 141 (representing an optical index of 2.15) and the line 143 (representing the CPW microwave index vs. electrode thickness of the electrodes 113, 115 and 117) intersect at about an electrode (113, 115 and 117) thickness of about 20 μm. An exact velocity match would be at a microwave index of 2.15, which is the optical index for a wavelength of 1.3 μm. Thus, to obtain an exact velocity match, the coplanar waveguide microwave (or effective) index 143 has to be made equal to the optical index 141. As shown in FIG. 9, this occurs at the point 144 where the lines 141 and 143 intersect.

The coplanar microwave index of the CPW coplanar mode for a given geometry of the electrode structure is determined by the thickness of the electrodes 113, 115 and 117. Therefore, the electrodes 113, 115 and 117 must be thick enough so that the coplanar waveguide microwave index is equal to the optical index in the uniaxial crystal (which is 2.15 in LiNbO₃). However, it should be realized that an exact velocity match could be obtained for a different optical index (for a different wavelength and/or for a different crystal material) by following a similar procedure.

The optical modulator of the invention can be implemented to operate with any optical wavelength, but the above-discussed optical modulators of the embodiment of FIGS. 5 and 6 and the embodiment of FIGS. 7 and 8 were implemented to operate at an optical wavelength of 1.3 µm.

Figure 10A:
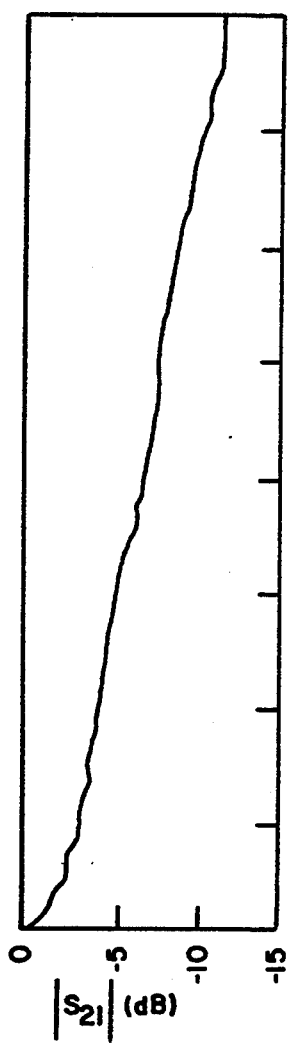
FIG. 10A illustrates the electrical transmission through coplanar microwave waveguides.
Figure 10B:
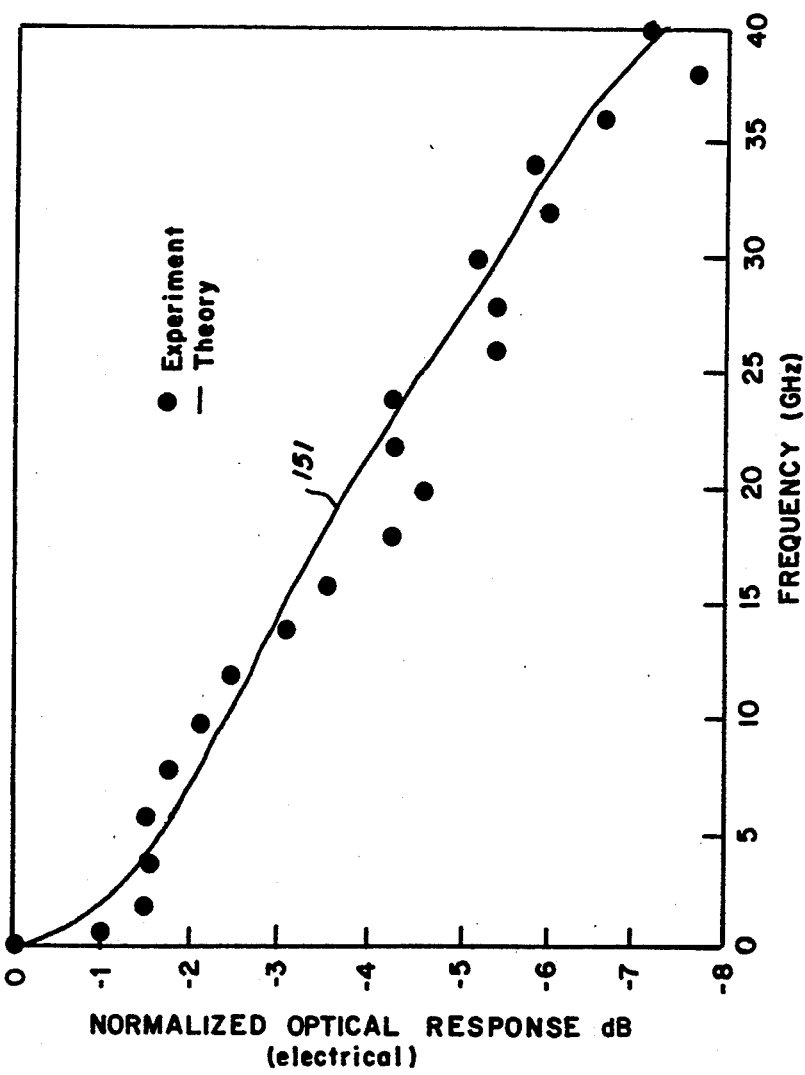
FIG. 10B illustrates the normalized optical response of the device of FIG. 5 or FIG. 7 in decibels (dB) of electrical power as a function of frequency.

Referring now to FIGS. 10A and 10B, FIG. 10A illustrates the electrical transmission through the coplanar microwave waveguide structure 111 (FIGS. 7 and 8 or FIGS. 5 and 6); and FIG. 10B illustrates the normalized optical response of the device of FIGS. 5 and 6 or of FIGS. 7 and 8 in dB of electrical power as a function of frequency.

FIG. 10A shows that the magnitude of $S_{21}$ in dB plotted against frequency over the frequency range from 0 Hz to 40 GHz, where $S_{21}$ is a transmission parameter from a network analyzer used in the measurement. FIG. 10A basically indicates what the transmission of the optical modulator of the invention is in dB as a function of frequency.

FIG. 10B shows the normalized response of the optical modulator of the invention in dB of electrical power, not optical power, as a function of frequency over the frequency range from 0 Hz to 40 GHz. Experimental data points are shown about a theoretical normalized optical response line 151. Note that the normalized optical response decreases with an increase in frequency. With a velocity matched optical modulator the drop off with frequency will be minimized. Ideally a flat response over the frequency range from 0 Hz to 40 GHz is desired. However, FIG. 10B shows that the optical modulator of the invention that was tested only dropped about 7.5 dB over the frequency range from 0 Hz to 40 GHz, which is a very good response.

Therefore, what has been described in preferred embodiments of the invention is a broadband, electro-optic modulator which, in an embodiment shown in FIGS. 5 and 6 comprises: a substrate having substrate modes, having electro-optic effects, and having a first optical waveguide adapted to receive and transmit light therethrough in a first direction and with a first phase velocity; a buffer layer disposed on the substrate; and a coplanar waveguide electrode structure having a coplanar mode and being disposed on the buffer layer for receiving an electrical signal propagating therethrough in the first direction with a second phase velocity to phase modulate the light in the optical waveguide at a frequency in the range from 0 Hz up to substantially 40 GHz. The substrate has a sufficiently small thickness so that coplanar-substrate coupling substantially does not occur over a desired frequency bandwidth of operation, and the coplanar waveguide electrode structure has a sufficiently large thickness so that the second phase velocity of the electrical signal is substantially equal to the first phase velocity. In an embodiment shown in FIGS. 7 and 8, an intensity modulator is produced by adding a second optical waveguide which, in combination with the first optical waveguide, forms an interferometer. The interaction of the electrical signal with the optical signal produces an intensity-modulated optical beam. This exemplary modulator is described further in G. K. Gopalakrishnan et al, "Electrical Loss Mechanisms in Travelling Wave LiNbO3 Optical Modulators," Electronics Letters, Vol. 28, No. 2, pp. 207–208 (16 Jan. 1992) and in G. K. Gopalakrishnan et al, "40 GHz Low Half-Wave Voltage Ti:LiNbO3 Intensity Modulators," Electronics Letters, Vol. 28, No. 9, pp. 826–827 (23 Apr. 1992), which articles are incorporated herein by reference.

The above-described exemplary intensity modulator is a traveling wave modulator, as distinguished from a lumped element modulator. As discussed in L. M. Johnson, "Relative Performance of Impedance-Matched Lumped-Element and Traveling-Wave Integrated-Optical Phase Modulators," (IEEE Photonics Technology Letters, Vol. 1, No. 5, May 1989, pp. 102–104), which is incorporated herein by reference, a lumped element modulator is modeled as and characterized by resistance and capacitance and by an impedance which varies with electrical frequency. A traveling wave modulator is modeled as and characterized by an impedance which is relatively independent of electrical frequency. Lumped element modulators are typically bound with wires to other components; traveling wave modulators are typically part of microwave transmission lines. The former type of modulator is typically more effective at lower frequencies (say, below 1 megahertz (MHz)) than at higher frequencies, and the latter type of modulator is typically more effective at higher than at lower frequencies.

The above-described exemplary intensity modulator is considered broadband, since it has good response over a preselected frequency range on the order of tens of GHz.

Having described the invention in general, the following example is given as a particular embodiment thereof and to demonstrate the practice and advantages thereof. It is understood the example is given by way of illustration and is not intended to limit the specification or the claims to follow in any manner. This example is discussed further in G. K. Gopalakrishnan et al, "A LiNbO3 Microwave-Optoelectronic Mixer with Linear Performance," 1993 IEEE MTT-S Digest, Conference Proceedings, International Microwave Symposium, Atlanta, Ga., pp. 1055–1058; G. K. Gopalakrishnan et al, "Microwave-Optical Mixing in LiNbO3 Modulators," IEEE Transactions on Microwave Theory and Techniques, Vol. 41, No. 12, pp. 2383–2391 (December 1993), which articles are incorporated herein by reference.

Referring now to FIG. 11, the above described exemplary modulators $M_1$ and $M_2$ may include biasing means 180 and 190, respectively. For each of the modulators $M_1$ and $M_2$, a DC bias voltage $S_{dc1}$ and $S_{dc2}$ is applied to a bias T-connector 200 and 210, respectively. An isolator 220 and 230 is coupled between the microwave signal producer 20 and the bias T-connector 200 and 210, respectively. As a result, the biasing means 180 and 190 produce biased microwave signals $S_1'$ and $S_2'$ for input to the input ports $152_1$ and $152_2$ of modulators $M_1$ and $M_2$, respectively.

Referring back to FIGS. 7 and 8, the modulators $M_1$ and $M_2$ are designed for operation at an optical wavelength of 1.3 µm with the characteristic impedance of the CPW line ($Z_D$) being approximately 35 ohms ($\Omega$). They are fabricated as follows: The electrodes 113, 115 and 117 are preferably made of gold and have thicknesses of 15 and 18 µm, respectively. The electrode 113 has a width of 8 µm. The gap width G between the center electrode 113 and each of the grounded electrodes 115 and 117 is selected to be 15 µm, while the grounded electrodes 115 and 117 are selected to be about 2–3 mm wide. The substrate 119 has a width of 8 mm and a thickness of from 0.2 to 0.15 mm for modulators $M_1$ and $M_2$, respectively. The electrode interaction length $L_1$ was 24 mm. The substrate 119 is coated with a 0.9 μm SiO$_2$ buffer layer 121.

As so fabricated, the modulators $M_1$ and $M_2$ have DC half-wave voltages $V_\pi$ of 4.2 and 5 Volts, respectively. When biased for maximum transmission, the optical insertion loss through each modulator is approximately 4 dB.

The above-described exemplary intensity modulator is considered a low drive voltage modulator since the DC drive voltage $V_\pi(DC)$ is below about 5 Volts. The significance of the modulator being a low drive voltage modulator is discussed further below.

Figure 12:
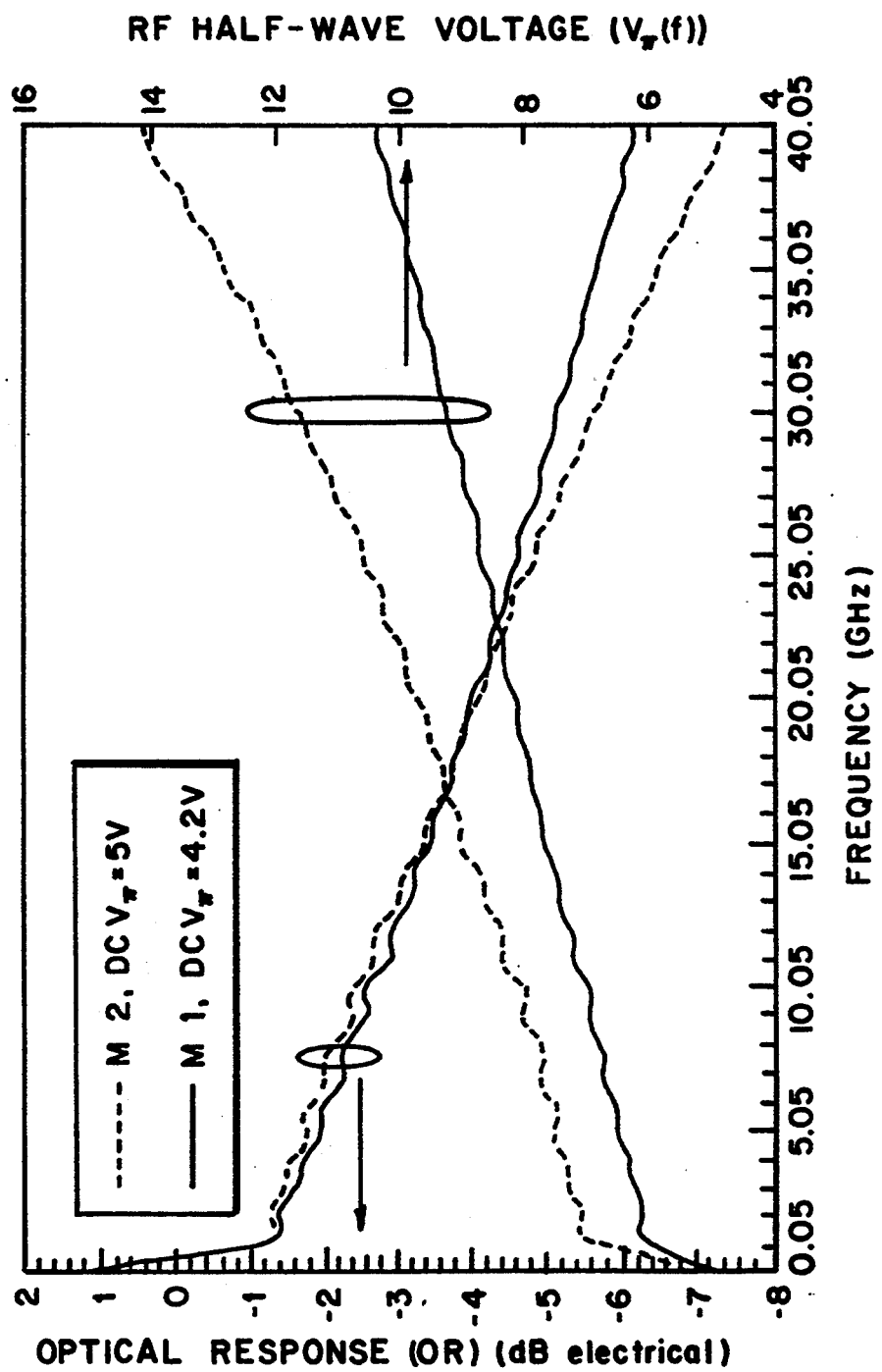
FIG. 12 illustrates the optical response and the RF half-wave voltage for modulators $M_1$ and $M_2$ of FIGS. 1 and 11.

From a fit to the electrical response of the modulator comprising conductor, dielectric and radiative losses and considering the microwave-optical index mismatch (0.06 for modulator $M_1$ and 0.128 for modulator $M_2$) obtained from a fit to the optical response, the modeled optical responses of the modulators $M_1$ and $M_2$ are shown in FIG. 12. Referring back to FIG. 11, the model also takes into consideration reflections that occur at the transition from the 35Ω CPW line to the 50Ω load 240 and 250 at the output ports 153$_1$ and 153$_2$, respectively. Here, a concern is to characterize traveling wave modulators in terms of their mixing efficiency. A fundamental mixer parameter that reflects mixing efficiency is its RF conversion loss. As will be discussed further later, the RF half-wave voltage $V_\pi(f)$ of the modulators $M_1$ and $M_2$, adequately characterizes the mixing efficiency of the modulators $M_1$ and $M_2$. The RF half-wave voltage $V_\pi(f)$ of the modulators $M_1$ and $M_2$ may be obtained from the optical response of the modulators $M_1$ and $M_2$ by using the following expression:

$$V_\pi(f) = V_\pi(DC) \cdot \left[\frac{Z_0 + Z_D}{2Z_D}\right] \cdot 10^{-OR/20}, \quad (4)$$

where $V_\pi(DC)$ is the half-wave voltage of the modulator at DC, $Z_0 = 50\Omega$ is the characteristic impedance of the line, $Z_D$ is the characteristic impedance of the CPW electrode of the device, and $OR$ is the optical response of the modulator in electrical decibels. Also shown in FIG. 12 are the modeled RF half-wave voltages $V_\pi(f)$ of $M_1$ and $M_2$ as a function of frequency f.

Referring back to FIG. 11, the above-described exemplary pair of interferometric modulators $M_1$ and $M_2$ are cascaded in series and down-conversion is demonstrated. This is done by applying a single-tone RF input $S_1$ of angular frequency $\omega_1$ to one modulator $M_1$, the modulated optical output $L_{m1}$ of which is mixed with a larger LO local oscillator pump signal $S_2$ of angular frequency $\omega_2$ applied to the other modulator $M_2$. The modulator $M_2$ produces a second modulated optical signal $L_{m2}$ having an angular frequency component at IF, i.e. the difference $|\omega_1 - \omega_2|$ between the angular frequencies $\omega_1$ and $\omega_2$. The second modulated optical signal $L_{m2}$ is detected with a photodetector 260, the output of which is applied to a spectrum analyzer 270 having a 50Ω load. The second modulated optical signal $L_{m2}$ produced by the modulator $M_2$ also has an angular frequency component at the sum $\omega_1 + \omega_2$ of the angular frequencies $\omega_1$ and $\omega_2$, but his component is not as relevant to down-conversion applications as the IF component.

The actual signals that take part in the mixing are optical signals (not shown) at the RF ($\omega_1$) and LO ($\omega_2$) frequencies, derived from electrical inputs $S_1'$ and $S_2'$, respectively, applied to modulators $M_1$ and $M_2$, respectively. To efficiently down-convert these to a desired IF, optical signals at both the RF and LO frequencies must be highly modulated, and, hence, to prevent leakage of power to other unwanted frequencies, both modulators $M_1$ and $M_2$ should be biased at quadrature.

In this configuration, the intended application of the cascaded modulator pair $M_1$—$M_2$ is for antenna remoting. Antenna remoting usually refers to an arrangement of source, fiber coupled remote (from the source and often from electrical power) modulator, and fiber coupled detector (usually located with the source). The RF signal from the detector is then usually electrically down-converted in a mixer and processes.

Upon application of this invention to antenna remoting, the RF signal is fed to one modulator, say, $M_1$ and the local oscillator LO to the other, say, $M_2$, with the modulator receiving the RF signal considered the remote modulator. The mixing process provides down-conversion, and only the IF needs to be detected. For such an application, one modulator $M_1$ can be used to transmit the relatively low-power RF-modulated optical signal $L_{m1}$ from a remote location over an optical fiber. The RF signal can then be down-converted by mixing the RF-modulated optical signal $L_{m1}$ with a relatively large LO pump signal $S_2$ applied to the other modulator $M_2$. Electrical mixing is no longer needed and the weak points of conventional microwave mixers, described earlier, are eliminated. The advantages of this approach for antenna remoting are that the IF is obtained directly at the detector, thus reducing demands on the detector, since the detector does not need to be broadband, and that the mixing is accomplished optically with broad bandwidth, on the order of tens of GHz, and with infinite port-to-port isolation.

This tandem arrangement of modulators $M_1$ and $M_2$ also allows for multiplication of RF signals applied to each modulator, and to up-conversion of RF signals applied to each modulator.

For a single Mach-Zehnder interferometer modulated by electrical RF signal $V \cdot \sin(\omega t)$ and having half-wave voltage $V_\pi$, the normalized ratio of output optical power $P_o$ to input optical power $P_i$ is $$\frac{P_o}{P_i} = \frac{1}{2}\left(1 + \cos\left[\phi_0 + \frac{\pi V}{V_\pi}\right]\right), \quad (5)$$

where $\phi_0$ is the intrinsic phase bias. In this derivation, each interferometer $M_1$ and $M_2$ is biased at quadrature, so $\phi_0 = 90°$.

If RF input signals $S_1 = V_1 \cdot \sin(\omega_1 t)$ and $S_2 = V_2 \cdot \sin(\omega_2 t)$ are applied to modulators $M_1$ and $M_2$, respectively, each biased at quadrature, then using equation (5), the ratio of the output optical power $P_o$ of the signal $L_{m2}$ to the input optical power $P_i$ of the source light $L_i$ is $$\frac{P_o}{P_i} = \frac{T_D}{4}\left(1 + \cos\left[\frac{\pi}{2} + \frac{\pi V_1}{V_{\pi 1}(\omega_1)}\right]\right) \cdot \quad (6)$$

$$\left(1 + \cos\left[\frac{\pi}{2} + \frac{\pi V_2}{V_{\pi 2}(\omega_2)}\right]\right),$$

where $T_D$ is the coupling and optical transmission losses of the system and $V_{\pi 1}(\omega_1)$ and $V_{\pi 2}(\omega_2)$ are the RF half-wave voltages of modulators $M_1$ and $M_2$ at angular frequencies $\omega_1$ and $\omega_2$, respectively. Rewriting and expanding equation (6) and neglecting terms higher than third order, we get:

$$\frac{P_o}{P_i} = \frac{T_D}{4} (1 - [2J_1(X_1)\sin\omega_1 t + 2J_3(X_1)\sin 3\omega_1 t] - \quad (7)$$

$$[2J_1(X_2)\sin\omega_2 t + 2J_3(X_2)\sin 3\omega_2 t] +$$

$$[2J_1(X_1)\sin\omega_1 t + 2J_3(X_1)\sin 3\omega_1 t] \cdot$$

$$[2J_1(X_2)\sin\omega_2 t + 2J_3(X_2)\sin 3\omega_2 t]),$$

where $J_n$ is the Bessel function of order n, $X_1=(\pi \cdot V_1)/(V_{\pi 1}(\omega_1))$, and $X_2=(\pi \cdot V_2)/(V_{\pi 2}(\omega_2))$.

From Equation (7), for $X_1 << 1$ and $X_2 << 1$, neglecting power terms higher than third order, we get $$\frac{P_o}{P_i} = \frac{T_D}{4} \left( 1 - X_1\sin\omega_1 t - X_2\sin\omega_2 t - \frac{X_1^3}{24}\sin 3\omega_1 t - \right. \quad (8)$$

$$\left. \frac{X_2^3}{24}\sin 3\omega_2 t + \frac{X_1 X_2}{2}[\cos(\omega_1-\omega_2)t - \cos(\omega_1+\omega_2)t] \right).$$

In equation (8), the terms associated with the third harmonic frequencies ($3\omega_1$ and $3\omega_2$) are small compared to the fundamental, sum and difference terms and hence can be neglected. It can be seen from the above derivation of equation (8) that the third order IM frequency terms ($2\omega_1-\omega_2$ and $2\omega_2-\omega_1$) are not present when each interferometer of the cascaded pair $M_1$—$M_2$ is biased at quadrature. In conventional mixers, if $\omega_1 \approx \omega_2$, then the IM frequencies would be very close to the signal frequencies and thus could not be filtered out. However, as shown, the present invention has low IM distortion. Furthermore, the power associated with the IM frequencies is proportional to the cube of the input voltages $V_1$ and $V_2$, so the power increases rapidly with input power thereby limiting the dynamic range of the mixer 10. The cascaded Mach-Zehnder interferometric pair $M_1$—$M_2$, when biased at quadrature, does not suffer from such drawbacks and hence is an attractive candidate for microwave-optoelectronic mixing.

The electrical power delivered by the photodetector 260 to the 50Ω load for angular frequencies $\omega_1-\omega_2$ and $\omega_1+\omega_2$ can be evaluated using the following expression:

$$P(\omega_1 \mp \omega_2) = L(\omega_1 \mp \omega_2)\frac{I_{DC}^2}{2}(2J_1(X_1) \cdot J_1(X_2))^2 \cdot 50, \quad (9)$$

where $L(\omega)$ collectively represents angular frequency dependent losses such as detector roll-off and cable losses that limit the performance of the fiber-optic link, and $I_{DC}$ is the detected DC photocurrent.

Figure 13:
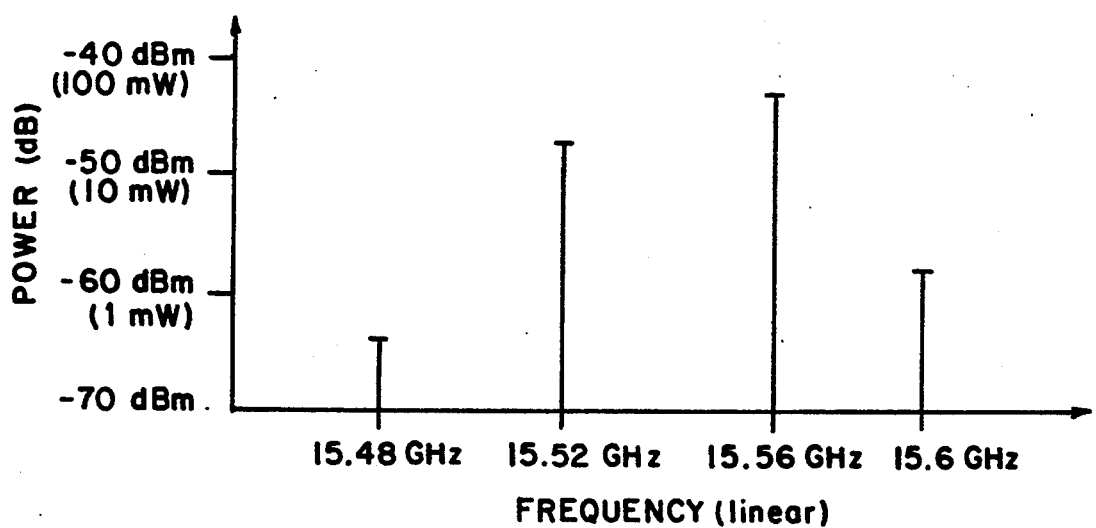
FIG. 13 shows the power spectrum of the mixer of FIG. 11 for off-quadrature bias.

To demonstrate the effect of quadrature biasing on IM distortion, the modulators $M_1$ and $M_2$ were biased off-quadrature, and equal amplitude input signals at $f_1=15.52$ GHz (RF) and $f_2=15.56$ GHz (LO) were applied to the modulators $M_1$ and $M_2$, respectively. The output spectrum, in addition to the signal terms $f_1$ and $f_2$, contains the following beat signals: the desired IF difference signal at $f_2-f_1=40$ MHz, and the undesired intermodulation signals at $2f_1-f_2=15.48$ GHz and $2f_2-f_1=15.6$ GHz. This is illustrated in FIG. 13, where the spectra of the signal and IM frequencies are shown.

Figure 14:
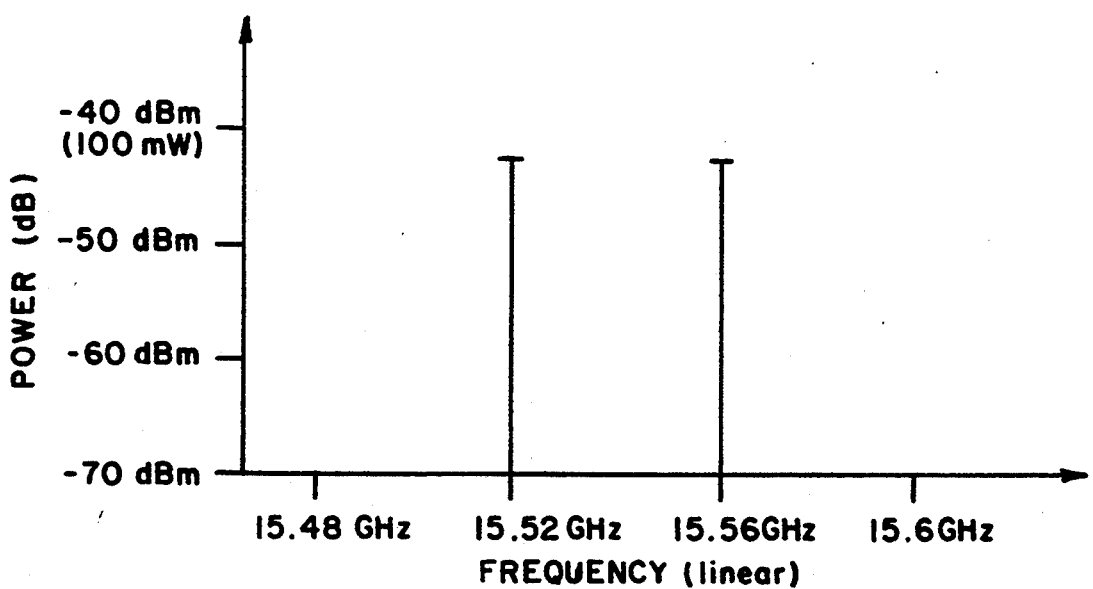
FIG. 14 shows the power spectrum of the mixer of FIG. 11 for bias at quadrature.

However, when each device $M_1$ and $M_2$ of the cascaded pair is biased at quadrature, the IM signals disappear, resulting in optical signals at just the signal and difference frequencies, as illustrated in FIG. 14. Since the mixer 10 conserves optical power, the less the power of output IM signals, the greater the power of output sum and IF signals, and therefore the more efficient the mixer 10 is. The mixer 10 in which modulators $M_1$ and $M_2$ are biased at quadrature is a more efficient mixer. In comparing FIGS. 13 and 14, it can be seen that more power is output in the sum and IF frequencies when the modulators $M_1$ and $M_2$ are biased at quadrature.

To demonstrate that the IF can be anywhere in the broadband DC to 40 GHz frequency range, the experiment was extended to higher frequencies. Signals $S_1$ and $S_2$ at frequencies $f_1=15$ GHz and $f_2=6$ GHz were applied to the modulators $M_1$ and $M_2$, respectively and the mixer 10 produced the IF difference signal at 9 GHz.

Figure 15:
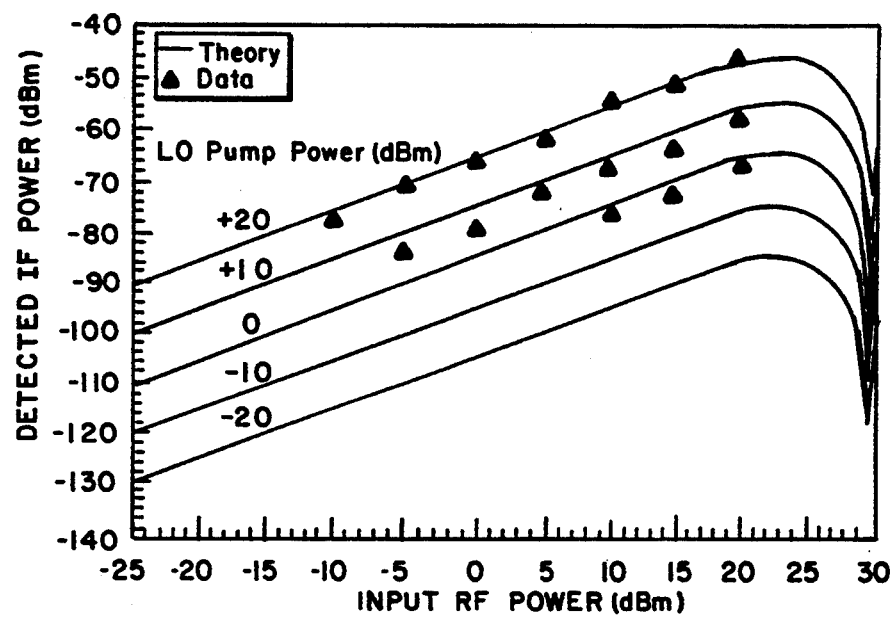
FIG. 15 shows the variation of detected IF power with respect to input RF power for the mixer of FIG. 11 when RF=15.52 GHz and LO=15.56 GHz.
Figure 16:
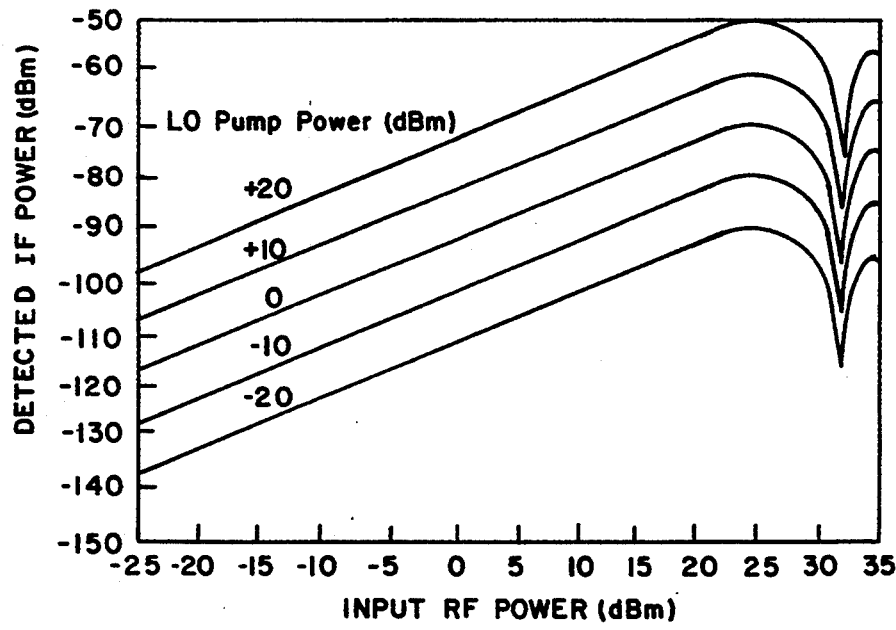
FIG. 16 shows the variation of detected IF power with respect to input RF power for the mixer of FIG. 11 when RF=40.02 GHz and LO=40.06 GHz.

For input signals at $f_1=15.52$ GHz (RF) and $f_2=15.56$ GHz (LO), FIG. 15 shows the variation of detected IF power at 40 MHz with input RF power for a detected DC photocurrent of 0.05 mA; the LO pump power was varied from −20 to +20 dBm (0.01 mW–100 mW). At these values of RF and LO, $V_{\pi 1}(f_1)=7.7$ V and $V_{\pi 2}(f_2)=8.9$ V. Since the IF was at 40 MHz, $L(\omega)$ is negligible. Here, with the LO pump power at +20 dBm, the conversion loss is approximately 66 dB. At 40 GHz ($f_1=40.02$ GHz, $f_2=40.06$ GHz; $V_{\pi 1}(f_1)=10.4$ V and $V_{\pi 2}(f_2)=14.2$ V), the corresponding computed results are shown in FIG. 16 and the conversion loss in this case for a pump power of +20 dBm is about 72 dB. Here, the relatively large conversion loss is attributable in part to the optical insertion loss of the interferometric pair $M_1$—$M_2$. We were limited to approximately 12 mW of optical power from the laser at the input to the first modulator $M_1$. At the output, for a detected DC photocurrent of 0.05 mA, the power striking the detector 260 was 0.1 mW (assuming a detector responsivity of 0.5 Amp/Watt) indicating an optical link loss in excess of 20 dB. Here, the modulators $M_1$ and $M_2$ biased at quadrature contribute to 14 dB (approximately 7 dB each) of this loss, and coupling losses account for the rest.

Figure 19:
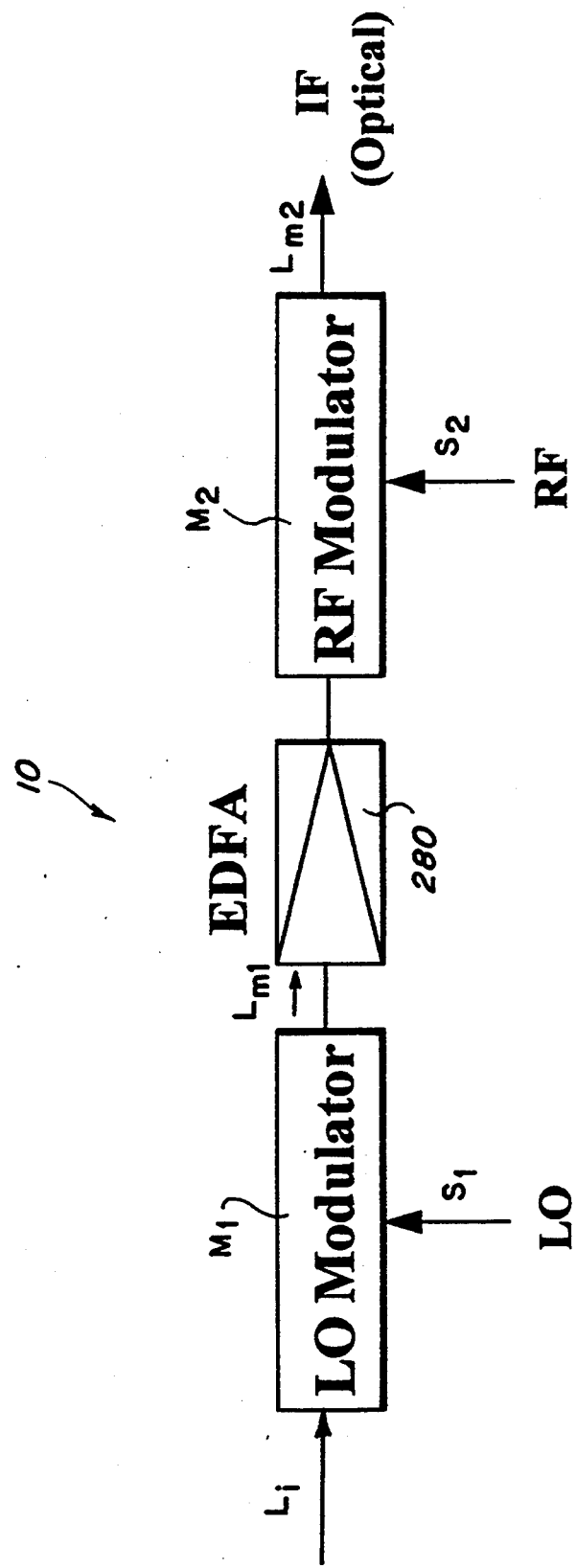
FIG. 19 illustrates a mixer employing an erbium doped fiber amplifier between the first and second modulators.
Figure 20:
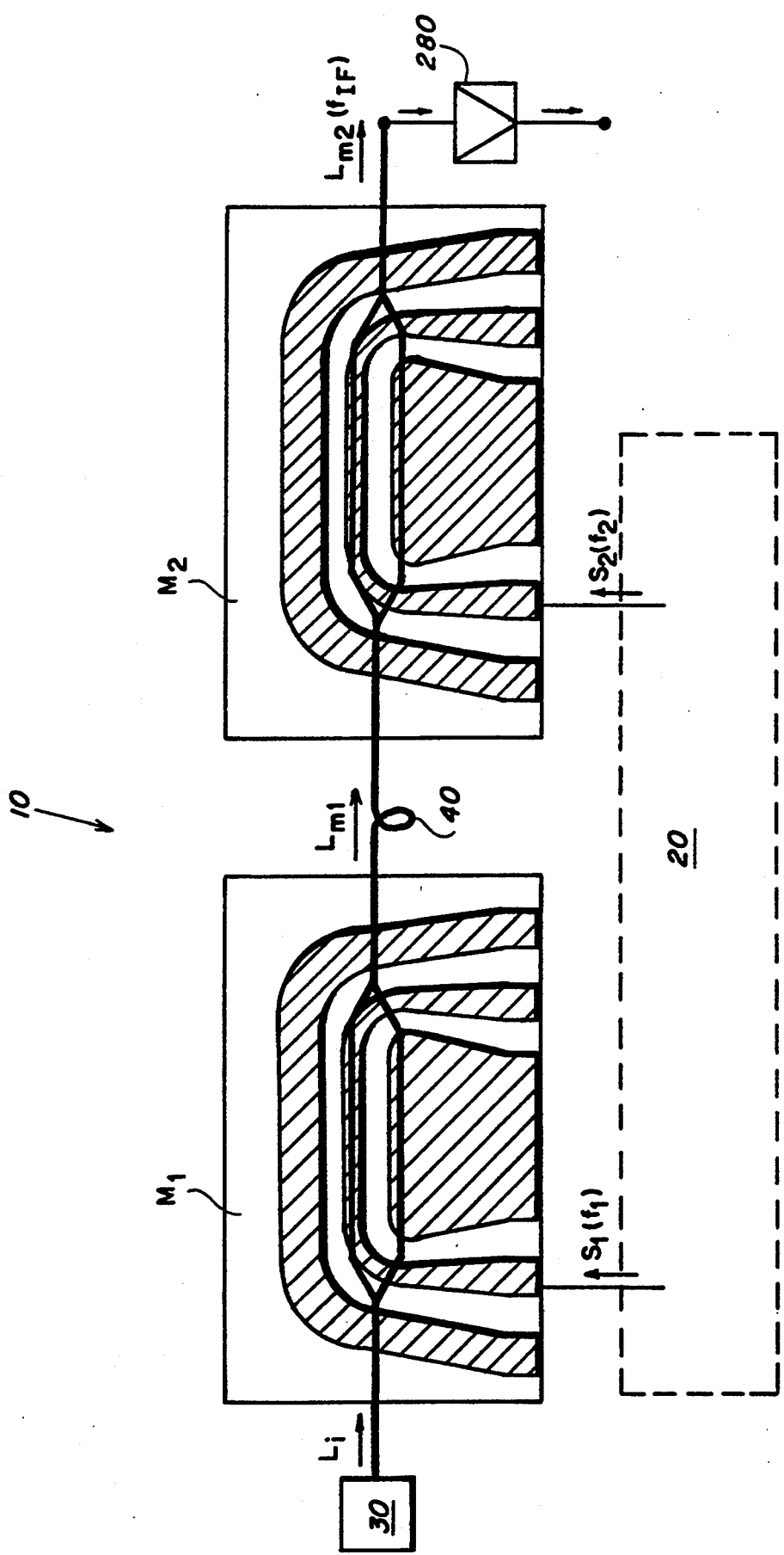
FIG. 20 illustrates a mixer employing an erbium doped fiber amplifier to amplify the output optical IF signal.

The conversion loss of the cascade interferometric pair $M_1$—$M_2$ would be significantly lower if the power on the photodetector 260 were larger. This may be accomplished by employing more powerful lasers 32, or by employing erbium doped fiber amplifiers (EDFA). In this context, we note again that the optical LO pump signal in our experiments was derived by applying a large electrical input to the modulator. If this input were increased further, then beyond a certain point, compression of the output would occur due to sinusoidal modulator response. In other words, for amplitude greater than the half-wave voltage $V_\pi(f)$, the modulation would swing over more than a half-wave. However, with erbium doped fiber amplifiers (EDFA) currently becoming available at an optical wavelength of 1.5 μm, a better way to generate this optical pump signal would be, as shown in FIG. 19, to employ an EDFA 280 to amplify the modulated optical LO pump signal $L_{m1}$ which could then be mixed with a lower RF signal $S_2$ to accomplish down-conversion. Alternatively, as shown in FIG. 20, an EDFA 280 could be employed to amplify the output IF signal.

Figure 17:
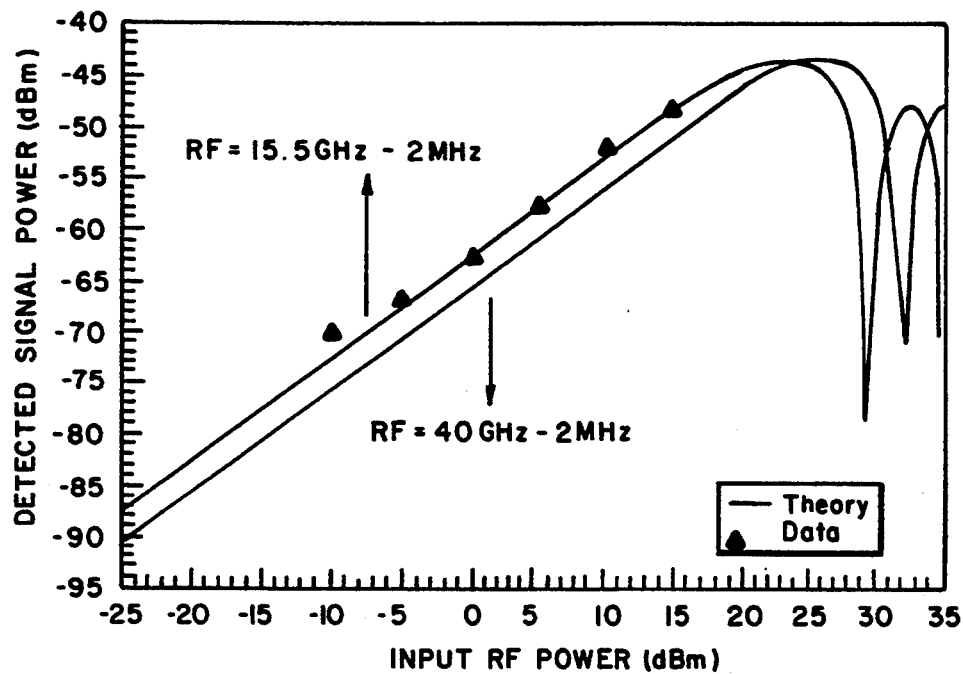
FIG. 17 shows the variation of detected IF power with respect to input RF power for the mixer of FIG. 11 for equal strength RF and LO signals.

The mixing efficiency of the interferometric pair for RF down-conversion is dependent on the strengths of the modulated optical RF and LO signals. It is, therefore, of interest to study optical modulation at the RF and LO signal frequencies. Towards this end, we applied two independent equal amplitude signals $S_1$ and $S_2$ spaced 40 MHz apart to the cascaded interferometric modulator pair $M_1$—$M_2$ biased at quadrature; the frequencies were centered around 15.5 GHz. For the modulating RF input corresponding to modulator $M_1$, we show in FIG. 17 the variation of the detected signal power as a function of input RF power, for a photodetector 260 current of 0.05 mA. for this measurement, $L(\omega) = -3$ dB. As shown, this data is in fairly good agreement with theory with the output increasing linearly with input for power levels that do not cause compression. Also shown, the computed response at 40 GHz assuming the same DC photocurrent and the same $L(\omega)$. In actuality, however, the signal strength at 40 GHz would be smaller than that predicted because $L(\omega)$ would be worse than $-3$ dB.

The significance of the exemplary modulators $M_1$ and $M_2$ having low drive voltage $V_\pi$ is in relation to conversion loss. The conversion loss is a fundamental mixer parameter employed to define the mixing efficiency. Conversion loss (CL) is defined as follows:

RF CL (dB)=detected IF power (dBm)—input RF power (dBm). (10)

The lower the conversion loss, the larger the detected down-converted IF signal strength, and hence the better the signal to noise ratio. For the first signal $S_1$ being the RF signal, and the second signal $S_2$ being the LO signal, equation (9) becomes:

$$P(RF \mp LO) = L(RF \mp LO)\frac{I_{DC}^2}{2}(2J_1(X_{RF}) \cdot J_1(X_{LO}))^2 \cdot 50. \quad (11)$$

In equation (11), the input RF power is contained in the $J_1(X_{RF})$ term, and the LO pump power is contained in the $J_1(X_{LO})$ term. The laser power is contained in the $I_{DC}$ term. Employing the small-signal argument for the Bessel function, it can be seen that the detected IF ($|RF-LO|$) output power is inversely proportional to the fourth power of the frequency dependent half-wave voltage $V_\pi$ of the modulators $M_1$ and $M_2$, and is directly proportional to the square of the detected DC current. Thus, the conversion loss of the mixer 10 can be decreased by either increasing the detected optical signal power, such as by employing high power lasers or optical amplifiers, or by employing modulators with lower half-wave voltages. A small decrease in half-wave voltage $V_\pi$ 33% results in the detected power being multiplied by a disproportionally large factor. For example, a decrease in half-wave voltage $V_\pi$ by 33% results in the detected power being multiplied by a factor of $(3/2)^4 = 2.5$. The modulator discussed in D. W. Dolfi et ano., "40 GHz Electro-Optic Modulator with 7.5 V Drive Voltage," Electronics Letters, Vol. 24, No. 9, pp. 528–529 (April, 1988) discusses a modulator having DC half-wave voltage of 7.5 V. As discussed above, the exemplary modulators $M_1$ and $M_2$ herein have DC half-wave voltage of about 5 V. Therefore, the mixer disclosed herein has detected power of about 2.5 times the detected power of the mixer disclosed in Johnson '086 using the modulators of Dolfi, supra.

Figure 18:
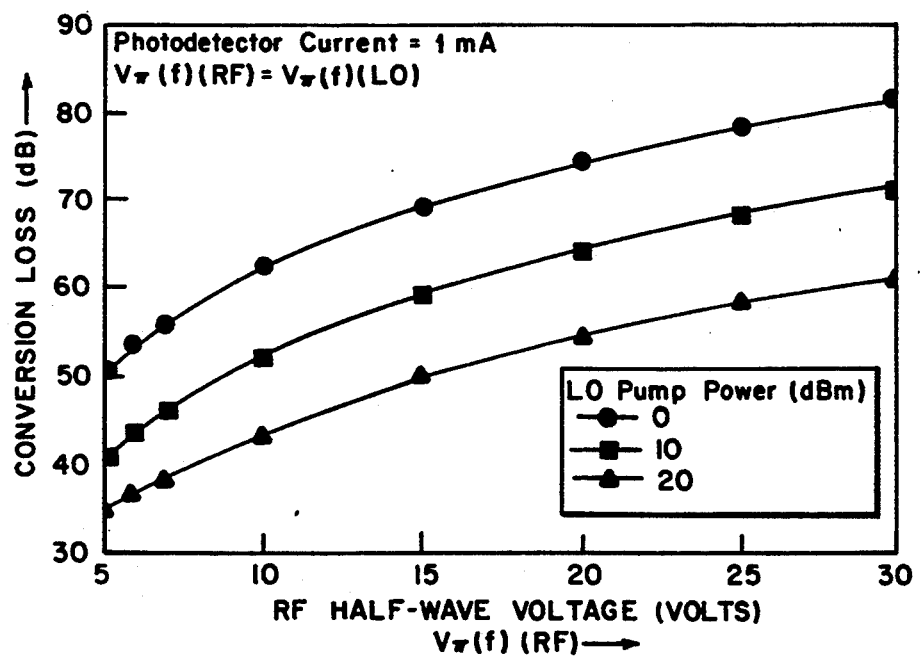
FIG. 18 illustrates the relation between RF Half-Wave Voltage and conversion loss.

Referring now to FIG. 18, the conversion loss in decibels is plotted against the RF Half-Wave voltage $V_\pi(f)(RF)$. As shown, the conversion loss increases rapidly as the RF half-wave voltage increases. The modulator discussed in Dolfi (supra) exhibits an RF half-wave voltage of 24 V. Thus, for a detected DC photocurrent of 1 milliAmp (mA) and a LO pump power of 20 dBm (100 milliWatts (mW), a cascade-connected pair of such modulators would provide a conversion loss of about 55 dB. The above-described exemplary modulator has an RF half-wave voltage of 10.4 V, and so the mixer shown in FIGS. 1 and 11 would have a conversion loss of about 43 dB, 12 dB better than Dolfi. A further improvement of 20 dB could be obtained if the detected photo-current could be increased to 10 mA with a more powerful laser or optical amplifier, as discussed further below. Overall, a conversion loss of less than about 40 dB provides a practical mixer. In systems with higher conversion losses, the modulated signal would be masked by noise.

For a detected photo-current of 0.05 mA, the measured signal-to-noise ratio of the mixer described herein in which amplifiers are not employed at the output is about 37 dB for IF at 9 GHz, and about 40 dB for IF at 40 MHz. These measurements reflect the noise of the spectrum analyzer 270.

It is understood that many other changes and additional modifications of the invention are possible in view of the teachings herein without departing from the scope of the invention as defined in the appended claims. For example, the intensity modulator disclosed above is not limited to LiNbO$_3$ optical modulators, but is equally applicable to proton exchanged waveguide modulators or any other type of electro-optic or electro-absorption modulators that use coplanar traveling wave electrodes. The invention is also applicable to similar modulators fabricated on semiconductor substrates. Although much of the above discussion is based on an RF signal being applied to the first modulator $M_1$ and an LO pump signal applied to the second modulator $M_2$, the first and second signals $S_1$ and $S_2$ applied to the first and second modulators $M_1$ and $M_2$, respectively, could be any appropriate microwave signals, including, for example, LO and RF, respectively. It is therefore to be understood that, within the scope of the appended claims, the invention may be practiced otherwise than as specifically described.

What is claimed is:

1. An electro-optic mixer comprising:
   (a) means for providing first and second microwave signals having first and second frequencies, respectively;
   (b) a device for providing a source light;
   (c) a first modulator responsive to the source light and to the first microwave signal for producing a first modulated optical signal;
   (d) a second modulator cascade coupled to said first modulator and being responsive to the first modulated signal and to the second microwave signal for producing a second modulated optical signal having a frequency component selected from the class consisting of the sum and difference of the first and second frequencies;
   each of said first and second modulators comprising:
   an associated substrate having substrate modes, having electro-optic effects and having first and second optical waveguides adapted to receive and transmit light therethrough in a first direction and with a first phase velocity;

an associated buffer layer disposed on said associated substrate; and an associated coplanar waveguide electrode structure having a coplanar mode and being disposed on said associated buffer layer for receiving an electrical signal propagating therethrough in the first direction with a second phase velocity to intensity modulate the light in said optical waveguides at a frequency in a preselected frequency range, said associated coplanar waveguide electrode structure having a sufficiently large thickness so that said second phase velocity of said electrical signal is substantially equal to said first phase velocity;

said associated substrate having a sufficiently small thickness so that coplanar mode-substrate mode coupling substantially does not occur upon operation in the preselected frequency range; and (e) means coupled between said first and second modulators for transmitting the first modulated signal from said first modulator to said second modulator.

2. The mixer of claim 1 wherein said preselected frequency range is from 0 Hz to substantially 40 GHz.

3. The mixer of claim 1 wherein:
said associated substrate in each of said first and second modulators has a thickness of less than about 0.25 mm; and
said associated coplanar waveguide electrode structure in each of said first and second modulators has a thickness of between about 12 $\mu$m and about 20 $\mu$m.

4. The mixer of claim 1 wherein: each of said associated coplanar waveguides in each of said first and second modulators comprises:
a center electrode and two grounded electrodes.

5. The mixer of claim 4 wherein: each of said center and grounded electrodes in each of said first and second modulators is comprised of gold.

6. The mixer of claim 4 wherein:
said first optical waveguide in each of said first and second modulators is disposed underneath said center electrode; and
said second optical waveguide in each of said first and second modulators is disposed underneath one of said grounded electrodes.

7. The mixer of claim 6 wherein: in each of said first and second modulators:
said first optical waveguide has a first width;
said second optical waveguide has a second width which is substantially equal to said first width; and
said one of said grounded electrodes has a third width which is greater than said second width.

8. The mixer of claim 7 wherein: in each of said first and second modulators: said center electrode has a second width which is substantially equal to said first width.

9. The mixer of claim 4 wherein: in each of said first and second modulators:
said first optical waveguide is disposed between said center electrode and a first one of said grounded electrodes; and
said second optical waveguide is disposed between said center electrode and a second one of said grounded electrodes.

10. The mixer of claim 1 wherein: said associated substrate in each of said first and second modulators is comprised of lithium niobate.

11. The mixer of claim 1 wherein: said associated buffer layer in each of said first and second modulators is comprised of silicon dioxide.

12. The mixer of claim 1 wherein: in each of said first and second modulators:
said associated substrate is comprised of lithium niobate;
said associated buffer layer is comprised of silicon dioxide; and
said associated coplanar waveguide comprises a center electrode and two grounded electrodes.

13. The mixer of claim 1 wherein said device (b) comprises a device for providing a polarized cw laser light source.

14. The mixer of claim 1 wherein said first and second modulators comprise first and second means, respectively, for respectively biasing said first and second modulators at quadrature.

15. The mixer of claim 1 wherein said second modulator (d) comprises a modulator disposed at a predetermined distance from said first modulator.

16. The mixer of claim 1 wherein said transmitting means (e) comprises polarization-maintaining means.

17. The mixer of claim 16 wherein said transmitting means (e) comprises a polarization-maintaining optical fiber.

18. The mixer of claim 1 wherein said transmitting means (e) comprises an erbium doped fiber amplifier.

19. The mixer of claim 1 further comprising an erbium doped fiber amplifier for amplifying the second modulated optical signal.

20. An electro-optic mixer comprising:
(a) means for providing first and second microwave signals having first and second frequencies, respectively;
(b) a device for providing a source light;
(c) a first modulator responsive to the source light and to the first microwave signal for producing a first modulated optical signal;
(d) a second modulator cascade coupled to said first modulator and being responsive to the first modulated signal and to the second microwave signal for producing a second modulated optical signal having a frequency component selected from the class consisting of the sum and difference of the first and second frequencies;
each of said first and second modulators comprising a broadband, traveling wave intensity modulator having DC drive voltage below about 5 Volts; and
(e) means coupled between said first and second modulators for transmitting the first modulated signal from said first modulator to said second modulator.

21. The mixer of claim 1 wherein said preselected frequency range is from 0 Hz to substantially 40 GHz.

22. The mixer of claim 20 wherein said device (b) comprises a device for providing a polarized cw laser light source.

23. The mixer of claim 20 wherein said first and second modulators comprise first and second means for respectively biasing said first and second modulators at quadrature.

24. The mixer of claim 20 wherein said second modulators (d) comprises a modulator disposed at a predetermined distance from said first modulator.

25. The mixer of claim 20 wherein said transmitting means (e) comprises polarization-maintaining means.

26. The mixer of claim 25 wherein said transmitting means (e) comprises a polarization-maintaining optical fiber.

27. The mixer of claim 20 wherein said transmitting means (e) comprises an erbium doped fiber amplifier.

28. The mixer of claim 20 further comprising an erbium doped fiber amplifier for amplifying the second modulated optical signal.

* * * * *